US007631013B2

(12) United States Patent
Parsons et al.

(10) Patent No.: US 7,631,013 B2
(45) Date of Patent: Dec. 8, 2009

(54) SYSTEM AND METHOD FOR PUBLISHING, DISTRIBUTING, AND READING ELECTRONIC INTERACTIVE BOOKS

(75) Inventors: Marcella Betz Parsons, Incline Village, NV (US); Katherine Mary Parsons, Incline Village, NV (US)

(73) Assignee: Sierra Interactive Systems, Inc., Incline Village, NV (US)

( * ) Notice: Subject to any disclaimer, the term of this patent is extended or adjusted under 35 U.S.C. 154(b) by 296 days.

(21) Appl. No.: 11/278,798

(22) Filed: Apr. 5, 2006

(65) Prior Publication Data

US 2006/0230340 A1 Oct. 12, 2006

Related U.S. Application Data

(60) Provisional application No. 60/669,166, filed on Apr. 6, 2005, provisional application No. 60/669,167, filed on Apr. 6, 2005, provisional application No. 60/669,205, filed on Apr. 6, 2005, provisional application No. 60/669,163, filed on Apr. 6, 2005, provisional application No. 60/669,289, filed on Apr. 6, 2005.

(51) Int. Cl.
G06F 17/00 (2006.01)
(52) U.S. Cl. .................................. 707/104.1
(58) Field of Classification Search ...................... 707/3, 707/10, 100, 103 Y, 104.1
See application file for complete search history.

(56) References Cited

U.S. PATENT DOCUMENTS

| | | | | |
|---|---|---|---|---|
| 5,524,201 A | * | 6/1996 | Shwarts et al. | 715/763 |
| 5,553,216 A | * | 9/1996 | Yoshioka et al. | 715/210 |
| 5,749,735 A | * | 5/1998 | Redford et al. | 434/307 R |
| 5,893,132 A | * | 4/1999 | Huffman et al. | 715/201 |
| 5,956,034 A | * | 9/1999 | Sachs et al. | 715/776 |
| 6,091,930 A | * | 7/2000 | Mortimer et al. | 434/362 |
| 6,105,044 A | * | 8/2000 | DeRose et al. | 715/234 |
| 6,112,201 A | * | 8/2000 | Wical | 707/5 |
| 6,275,142 B1 | * | 8/2001 | Paleiov et al. | 340/10.1 |
| 6,453,310 B1 | * | 9/2002 | Zander | 707/1 |
| 6,493,734 B1 | * | 12/2002 | Sachs et al. | 715/212 |
| 6,597,314 B1 | * | 7/2003 | Beezer et al. | 715/812 |
| 6,700,553 B2 | | 3/2004 | Becker et al. | |
| 6,704,733 B2 | * | 3/2004 | Clark et al. | 707/10 |
| 6,707,926 B1 | * | 3/2004 | Macy et al. | 382/100 |
| 6,714,214 B1 | * | 3/2004 | DeMello et al. | 715/711 |
| 6,776,619 B1 | | 8/2004 | Roberts et al. | |
| 6,996,720 B1 | | 2/2006 | DeMello et al. | |
| 7,009,595 B2 | | 3/2006 | Roberts et al. | |

(Continued)

*Primary Examiner*—Don Wong
*Assistant Examiner*—Thanh-Ha Dang
(74) *Attorney, Agent, or Firm*—Sughrue Mion, PLLC; Pavel I. Pogodin

(57) ABSTRACT

A book or other digital content is represented as a set of objects in a relational database schema format called IBF (Interactive Book Format) and the controlling system software. This design provides for viewing books in a manner that coordinates additional information and provides interaction with the original book, while not disturbing the original publication and copyrighted material and even protecting that copyrighted material from piracy by supporting industry standard digital rights management security features. The inventive technique includes the use of conversion engines which will aid publishers in converting existing books into IBF format. The inventive technology further provides the ability to read any book in IBF format on a computer using refreshable Braille display, allowing the reader the advantage of reading all books in this format without having to purchase expensive, specially made Braille books.

13 Claims, 20 Drawing Sheets

U.S. PATENT DOCUMENTS

| | | | |
|---|---|---|---|
| 7,020,663 B2 * | 3/2006 | Hay et al. | 707/104.1 |
| 7,111,774 B2 * | 9/2006 | Song | 235/375 |
| 7,243,299 B1 * | 7/2007 | Rubin et al. | 715/209 |
| 7,287,214 B1 * | 10/2007 | Jenkins et al. | 715/205 |
| 7,316,566 B2 * | 1/2008 | Carro | 434/113 |
| 7,346,844 B1 * | 3/2008 | Baer et al. | 434/362 |
| 7,424,285 B2 * | 9/2008 | Jei | 455/412.1 |
| 2001/0007980 A1 * | 7/2001 | Ishibashi et al. | 705/26 |
| 2001/0037334 A1 * | 11/2001 | Valentine | 707/10 |
| 2003/0014276 A1 * | 1/2003 | Kline | 705/1 |
| 2003/0043144 A1 * | 3/2003 | Pundarika et al. | 345/419 |
| 2003/0093382 A1 * | 5/2003 | Himeno et al. | 705/51 |
| 2003/0144961 A1 * | 7/2003 | Tharaken et al. | 705/57 |
| 2004/0003240 A1 * | 1/2004 | Lai et al. | 713/165 |
| 2004/0071065 A1 * | 4/2004 | Christensen | 369/53.21 |
| 2004/0139400 A1 | 7/2004 | Allam et al. | |
| 2005/0148322 A1 * | 7/2005 | Jei | 455/412.1 |
| 2005/0149538 A1 * | 7/2005 | Singh et al. | 707/100 |
| 2006/0235855 A1 * | 10/2006 | Rousseau et al. | 707/100 |
| 2007/0180471 A1 * | 8/2007 | Unz | 725/52 |

* cited by examiner

| Field | Data Type | Length in Bytes |
|---|---|---|
| Header String | string_t | 32 |
| Version | Int32_t | 8 |
| Data Length | uint32_t | 8 |

Figure 7- The IBF Header

| Field | Data Type | Length in Bytes |
|---|---|---|
| Title | uint32_t | 8 |
| Pad Length | uint32_t | 8 |
| Data Length | uint32_t | 8 |
| IBF Object Data | uint32_t | 8 |

Figure 8 – An IBF Object

| Field | Data Type | Length in Bytes |
|---|---|---|
| Category Type 1 | uint32_t | 8 |
| Book List 1 | int32_t | 8 |
| ... | ... | ... |
| Category Type N | uint32_t | 8 |
| Book List N | int32_t | 8 |

Figure 9 – The IBF Library Object Data

| Field | Data Type | Length in Bytes |
|---|---|---|
| Book 1 | int32_t | 8 |
| Book 2 | int32_t | 8 |
| ... | int32_t | 8 |
| Book N | int32_t | 8 |

Figure 10 – The IBF Book List Object Data

| Field | Data Type | Length in Bytes |
|---|---|---|
| Security Key | uint32_t | 1024 |
| Title | string_t | 250 |
| Language | uint32_t | 8 |
| ISBN number | uint32_t | 16 |
| Owner | int32_t | 8 |
| Price | int32_t | 8 |
| Price Format | uint32_t | 8 |
| Annotation | int32_t | 8 |

Figure 11 – The IBF Book Object Data

| Field | Data Type | Length in Bytes |
|---|---|---|
| Publisher Name | string_t | 250 |
| Publisher Address – Street | string_t | 250 |
| Publisher Address – Town | string_t | 250 |
| Publisher Address – State | string_t | 250 |
| Publisher Address – Zip Code | string_t | 250 |
| Publisher Address – Phone - office | string_t | 250 |
| Publisher Address – website | string_t | 250 |
| Publisher Address – email contact | string_t | 250 |

Figure 12 - The IBF Owner Object Data

| Field | Data Type | Length in Bytes |
|---|---|---|
| Title Pages | int32_t | 8 |
| Preface | int32_t | 8 |
| Chapter 1 | int32_t | 8 |
| ... | int32_t | 8 |
| Chapter N | int32_t | 8 |

Figure 13 - The IBF TOC Object Data

| Field | Data Type | Length in Bytes |
|---|---|---|
| Title | string_t | 250 |
| Copyright | string_t | 250 |
| Title Image - Type | uint32_t | 8 |
| Title Image - Length | uint32_t | 8 |
| Title Image | Image file type | Sizeof (Title Image) |
| Logo - Type | uint32_t | 8 |
| Logo - Length | uint32_t | 8 |
| Logo Image | Image file type | Sizeof (Title Image) |
| Logo Text | string_t | 250 |
| Format | Int32_t | 8 |

Figure 14 - The IBF Title Pages Object Data

| Field | Data Type | Length in Bytes |
|---|---|---|
| Title | string_t | 250 |
| Page 1 | int32_t | 8 |
| ... | int32_t | 8 |
| Page N | int32_t | 8 |
| Title Image - Type | uint32_t | 8 |
| Title Image - Length | uint32_t | 8 |
| Title Image | Image file type | Sizeof (Title Image) |
| Format | int32_t | 8 |

Figure 15 - The IBF Chapter Object Data

| Field | Data Type | Length in Bytes |
|---|---|---|
| Paragraph List | int32_t | 8 |
| Zoom size | int32_t | 8 |
| Pagination on/off | uint32_t | 8 |
| Page number | int32_t | 8 |

Figure 16 - The IBF Page Object Data

| Field | Data Type | Length in Bytes |
|---|---|---|
| Paragraph 1 | int32_t | 8 |
| ... | int32_t | 8 |
| Paragraph N | int32_t | 8 |

Figure 17 - The IBF Paragraph List Object Data

| Field | Data Type | Length in Bytes |
|---|---|---|
| Text - Length | uint32_t | 8 |
| Text | string_t | Text – Length size |
| Format | int32_t | 8 |
| Additional Content 1 | int32_t | 8 |
| Additional Content 2 | int32_t | 8 |
| ... | int32_t | 8 |
| Additional Content N | int32_t | 8 |
| Image List | int32_t | 8 |
| Audio List | int32_t | 8 |
| Animation List | int32_t | 8 |
| Highlight List | int32_t | 8 |
| Notes List | int32_t | 8 |
| Drawing List | int32_t | 8 |

Figure 18 - The IBF Paragraph Object Data

| Field | Data Type | Length in Bytes |
|---|---|---|
| Font Character Set | uint32_t | 8 |
| Font Family Name | string_t | 250 |
| Pt Size | int32_t | 8 |
| Type Style | int32_t | 8 |
| Kerning | int32_t | 8 |
| Vertical Scale | int32_t | 8 |
| Horizontal Scale | int32_t | 8 |
| Tracking | int32_t | 8 |
| Skew | int32_t | 8 |
| Language | uint32_t | 8 |

Figure 19 - The IBF Format Object Data

| Field | Data Type | Length in Bytes |
|---|---|---|
| Image 1 - Type | uint32_t | 8 |
| Image 1- Length | uint32_t | 8 |
| Image File 1 | image_file_type | Image 1- length |
| Image 1 - Position x | int32_t | 8 |
| Image 1 - Position y | int32_t | 8 |
| Image 1 - Text | string_t | 128 |
| ... | | |
| Image N - Type | uint32_t | 8 |
| Image N- Length | uint32_t | 8 |
| Image File N | image_file_type | Image N- length |
| Image N Position x | int32_t | 8 |
| Image N Position y | int32_t | 8 |
| Image N - Text | string_t | 128 |

Figure 20 - The IBF Image List Object Data

| Field | Data Type | Length in Bytes |
|---|---|---|
| Audio 1 - Type | uint32_t | 8 |
| Audio 1- Length | uint32_t | 8 |
| Audio File 1 | Audio file type | Audio 1- length |
| Audio 1 Position x | int32_t | 8 |
| Audio 1 - Position y | int32_t | 8 |
| Audio 1 - Text | string_t | 128 |
| ... | | |
| Audio N - Type | uint32_t | 8 |
| Audio N- Length | uint32_t | 8 |
| Audio File N | Audio_file_type | Audio N- length |
| Audio N Position x | int32_t | 8 |
| Audio N Position y | int32_t | 8 |
| Audio N - Text | string_t | 128 |

Figure 21 - The IBF Audio List Object Data

| Field | Data Type | Length in Bytes |
|---|---|---|
| Animation 1 - Type | uint32_t | 8 |
| Animation 1- Length | uint32_t | 8 |
| Animation File 1 | Animation_file_type | Animation 1- length |
| Animation 1 Position x | int32_t | 8 |
| Animation 1 Position y | int32_t | 8 |
| Animation 1 - Text | string_t | 128 |
| ... | | |
| Animation N - Type | uint32_t | 8 |
| Animation N - Length | uint32_t | 8 |
| Animation File N | Animation_file_type | Animation N- length |
| Animation N Position x | int32_t | 8 |
| Animation N Position y | int32_t | 8 |
| Animation N - Text | string_t | 128 |

Figure 22 - The IBF Animation List Object Data

| Field | Data Type | Length in Bytes |
|---|---|---|
| Highlighted Offset 1 | uint32_t | 8 |
| Highlighted Length 1 | uint32_t | 8 |
| ... | | |
| Highlighted Offset N | uint32_t | 8 |
| Highlighted Length N | uint32_t | 8 |

Figure 23 - The IBF Highlight List Object Data

| Field | Data Type | Length in Bytes |
|---|---|---|
| Note 1 | string_t | 4096 |
| Associated Text Offset 1 | int32_t | 8 |
| Note 2 | string_t | 4096 |
| Associated Text Offset 2 | int32_t | 8 |
| ... | string_t | 4096 |
| Note N | string_t | 4096 |
| Associated Text Offset N | int32_t | 8 |

Figure 24 - The IBF User Notes Object Data

| Drawing 1 – Type | uint32_t | 8 |
|---|---|---|
| Drawing 1- Length | uint32_t | 8 |
| Drawing 1 | image_file_type | Drawing 1- length |
| ... | | |
| Drawing N – Type | uint32_t | 8 |
| Drawing N- Length | uint32_t | 8 |
| Drawing N | image_file_type | Drawing N- length |

Figure 25 - The IBF Drawing List Object Data

| Field | Data Type | Length in Bytes |
|---|---|---|
| User Group 1 | string_t | 250 |
| Username | string_t | 250 |
| Password | string_t | 250 |
| Other Security | int32_t | 8 |
| User Group 2 | string_t | 250 |
| Username | string_t | 250 |
| Password | string_t | 250 |
| Other Security | int32_t | 8 |
| ... | string_t | 250 |
| User Group N | string_t | 250 |
| Username | string_t | 250 |
| Password | string_t | 250 |
| Other Security | uint32_t | 8 |

Figure 26 - The IBF User Group List Object Data

SYSTEM AND METHOD FOR PUBLISHING, DISTRIBUTING, AND READING ELECTRONIC INTERACTIVE BOOKS

CROSS-REFERENCE TO RELATED APPLICATIONS

This Application claims priority from U.S. Provisional Application No. 60/669,166 filed Apr. 6, 2005, from U.S. Provisional Application No. 60/669,167 filed Apr. 6, 2005, from U.S. Provisional Application No. 60/669,205 filed Apr. 6, 2005, from U.S. Provisional Application No. 60/669,163 filed Apr. 6, 2005 and from U.S. Provisional Application No. 60/669,289 filed Apr. 6, 2005; the entire disclosures of which are incorporated herein by reference.

DESCRIPTION OF THE INVENTION

1. Field of the Invention

This invention generally relates to electronic publishing and, more specifically, to publishing, distributing, and reading electronic interactive books.

2. Description of the Related Art

The publishing industry is undergoing significant changes due to the emergence of digital printing and digital publishing tools. Most publishers, although using a host of tools that support digital books, are still reluctant to sell their books in electronic format as opposed to bound paper, due to security and piracy issues. These concerns have not been resolved to date sufficiently for publishers to produce their books in a digital format. The book industry is facing the same problems that the online digital music industry faced in the last five years. The majority of books are still produced in paper format which has become increasingly expensive for the publisher and greatly lowers the profit per book.

The reading population does not seem to enjoy reading the currently available digital books. Digital books as currently produced are merely digital representations of the printed versions of books. The popular formats for digital books, the page description languages, are based on printing technology and are still quite static. Also, most of the reading public does not enjoy reading a book on a computer. Readers would still prefer to hold a real book in their hands and would prefer a printed book as evidenced by the book sale statistics over the last ten years.

However, the future readers will desire to use a hand-held device that operates similar to an ordinary book. This device may contain paper-like pages that display simulated ink in such a fashion that it reads like ink on paper. This is sometimes referred to as "eInk" and "ePaper". This technology is already being created and one day it will become the standard. When the reading public finally accepts and starts buying books in digital format at a fraction of the cost of books in print, then the digital publishing industry will take off. To facilitate this migration, books must be created in a new format utilizing all the advantages of being digitized. Now the reading public may experience additional content and interaction with their books as described in this patent. With the design presented here, the user may actually personalize their book, without disturbing the original copyrighted material.

Accordingly, what is needed is a novel and improved technique for electronic publishing.

SUMMARY OF THE INVENTION

The inventive methodology is directed to methods and systems that substantially obviate one or more of the above and other problems associated with conventional techniques for electronic publishing.

In accordance with one aspect of the inventive concept, there is provided a method, a computer programming product and a computerized system. In accordance with this aspect of the inventive concept, published electronic content is represented in a relational database schema and stored in a relational database. The published electronic content is retrieved from the database using a software system interfacing with the relational database. After the retrieving, the retrieved published electronic content is displayed on a display media. The published electronic content is approved by the respective publisher thereof.

In accordance with another aspect of the inventive concept, there is provided a method, a computer programming product and a computerized system. An inventive system in accordance with this aspect of the inventive concept includes a plurality of federated database servers operable to provide horizontal view to all member servers of a catalogue of electronic material available for download onto an electronic reading system containing a database. The system is further operable to enable user groups to access the electronic material contained in the catalogue and, upon purchase, download the electronic material into at least one electronic reading system of at least one member of the user groups in a seamless manner.

In accordance with yet another aspect of the inventive concept, there is provided a method, a computer programming product and a computerized system for viewing a book in an electronic format on two physically separated electronic devices. A first device displays one page of the book at a time, while a second device displays multiple control menus and additional content associated with the page of the book displayed by the first device.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 7 illustrates an exemplary embodiment of IBF Header;

FIG. 8 illustrates an exemplary embodiment of IBF Object;

FIG. 9 illustrates an exemplary embodiment of IBF Library Object Data;

FIG. 10 illustrates an exemplary embodiment of IBF Book List Object Data;

FIG. 11 illustrates an exemplary embodiment of IBF Book Object Data;

FIG. 12 illustrates an exemplary embodiment of the IBF Owner Object Data;

FIG. 13 illustrates an exemplary embodiment of the IBF TOC Object Data;

FIG. 14 illustrates an exemplary embodiment of IBF Title Pages Object Data;

FIG. 15 illustrates an exemplary embodiment of IBF Chapter Object Data;

FIG. 16 illustrates an exemplary embodiment of IBF Page Object Data;

FIG. 17 illustrates an exemplary embodiment of IBF Paragraph List Object Data;

FIG. 18 illustrates an exemplary embodiment of IBF Paragraph Object Data;

FIG. 19 illustrates an exemplary embodiment of IBF Format Object Data;

FIG. 20 illustrates an exemplary embodiment of IBF Image List Object Data;

FIG. 21 illustrates an exemplary embodiment of IBF Audio List Object Data;

FIG. 22 illustrates an exemplary embodiment of IBF Animation List Object Data;

FIG. 23 illustrates an exemplary embodiment of IBF Highlight List Object Data;

FIG. 24 illustrates an exemplary embodiment of IBF User Notes Object Data;

FIG. 25 illustrates an exemplary embodiment of IBF Drawing List Object Data; and FIG. 26 illustrates an exemplary embodiment of IBF User Group List Object Data.

DETAILED DESCRIPTION

Figure 1A:
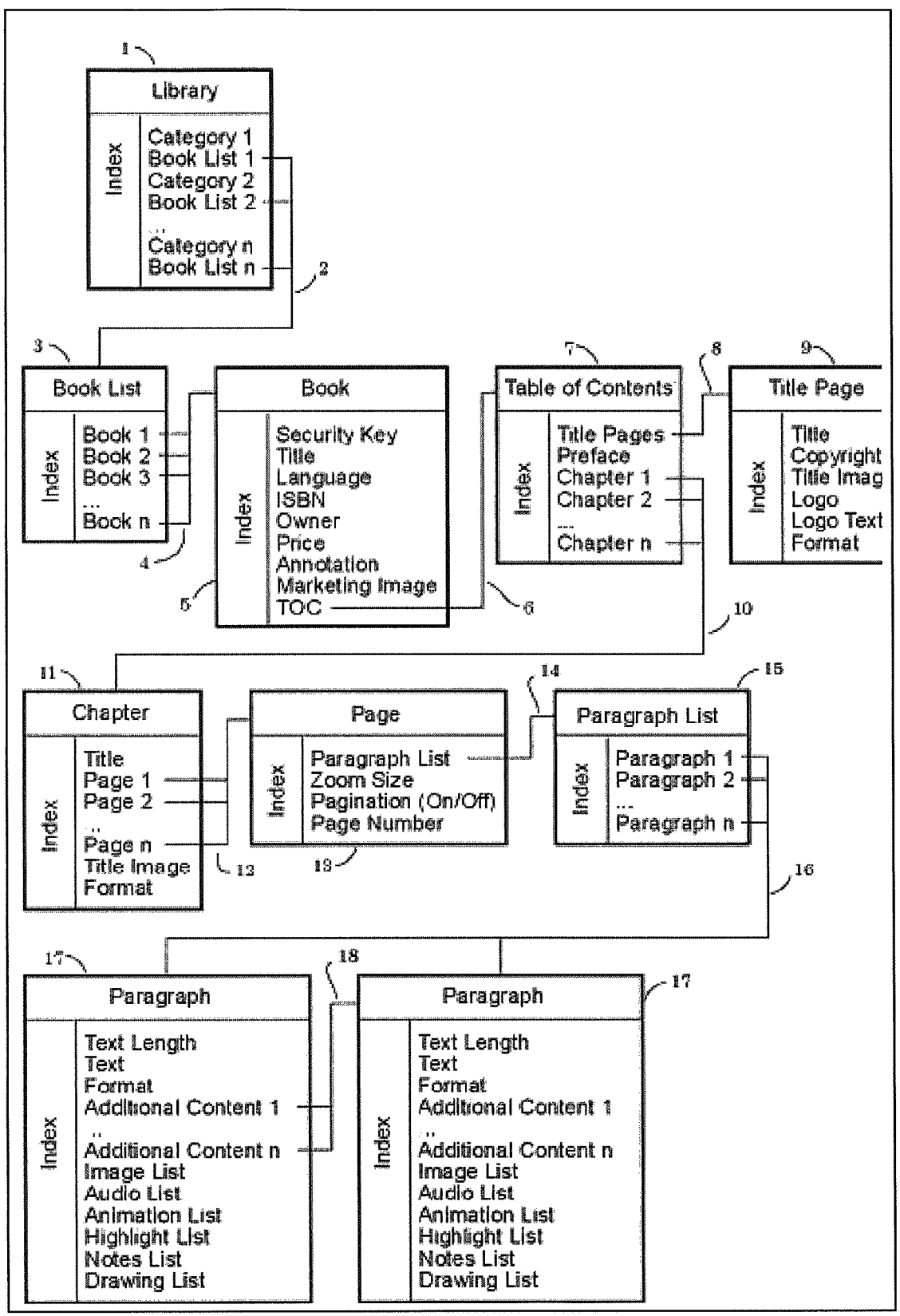
FIG. 1A shows the main IBF Data Objects and their relationships.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

1 Representation of the IBF Book Data

In accordance with an embodiment of the inventive technique, a book is represented as a set of objects in the relational database schema called IBF. As would be appreciated by those of skill in the art, in order to support a dynamic and interactive book which can correlate text, sound, animation, images, and control in a synchronized fashion, the data must be interrelated and easily accessible. The system software developed to manage the book and connect to the underlying embedded relational database will also be described herein.

The IBF data may begin with an IBF Header allowing processing software to recognize it as IBF data. An IBF book or item of digital content would be transmitted via download or loaded from storage media with an IBF Header followed by a series of IBF Objects as described in Section 1.2. Section 1.3 describes the types of data that could appear in the data field of each IBF Object.

1.1 IBF Header

Every IBF book or item of digital content must include and start with an IBF Header.

The IBF Header is comprised of:

The IBF Header String=the string "Interactive Book Format"

The Version field (e.g. Version 1.0.0)

The Data Length field is the length of all data following the header.

Please see FIG. 7 for a complete description of an exemplary IBF Header; the field descriptions, lengths, and data. After this header, all data following will be an IBF Object with one of the IBF Object Data types as data.

1.2 The IBF Objects

Once the IBF Header has been parsed, all following data is in the form of an IBF Object. Section 1.2.2 describes an exemplary format of IBF Objects. Some of the Object Data items described below have in their fields an "index" into the database for another type of object. When these objects are first being loaded into the system, this index will represent an offset in bytes from the current position to the object it is referencing in the incoming data stream. Once this IBF book is loaded into the underlying database in the system, this index can become a real index into the embedded relational database.

1.2.1 Object Data Types

A IBF Object may be comprised of the following data types based on POSIX types:

typedef uint8_t byte_t, byteint; // Un-signed 8-bit value
typedef uint16_t word_t, wordint; // Un-signed 16-bit value
typedef uint32_t long_t, longint; // Un-signed 32-bit value
typedef int8_t byte_t, byteint; // Signed 8-bit value typedef int16_t word_t, wordint; // Signed 16-bit value
typedef int32_t long_t, longint; // Signed 32-bit value
typedef char *string_t;
image_file_type
audio_file_type animation_file_type An image type may be selected from the following enumerated list:
1. Animation Shop (.psp)
2. CALS Raster (.cal, .cals)
3. CompuServe Graphics Interchange (.gif)
4. Deluxe Paint (.lbm)
5. Encapsulated Post Script (.sps, .ai, .ps)
6. GEM Paint (.img)
7. Interchange File Format (.iff)
8. JPEG (.jpg, .jpe, .jpeg)
9. JPEG 2000 (.jp2, .jc2, .j2k, .jpc, .jpx)
10. Macintosh PICT (.pct)
11. MacPaint (.mac)
12. Microsoft Paint (.msp)
13. PhotoShop (.psd)
14. Portable Bitmap (.pbm)
15. Portable Greymap (.pgm)
16. Portable Pixelmap (.ppm)
17. RAW Graphics File Format (.raw)
18. SG Image File (.rgb, .bw, .rgba, .sgi)
19. Sun Raster (.ras)
20. Tagged Image File Format (.tif, .tiff)
21. Truevision Targa (.tga)
22. Windows Meta File (.wmf)
23. Windows Run-Length Encoded (RLE)
24. Windows or OS/2 Bitmap (.bmp)
25. Wireless Bitmap (.wbmp, .wbm)
26. Z Soft Paintbrush (.pcx)
27. Other image types An audio file type may include:
1. CDA
2. MP3
3. WAV
4. OGG
5. Other An animation type is from the following enumerated list:
1. MPEG-1
2. MPEG-2
3. MPEG-3
4. AVI
5. QuickTime
6. Real Movie
7. FLI files (Autodesk Animator)
8. FLH & FLT files (DTA)
9. FLX files (Tempra Pro, Mathematica Inc.)
10. Extensions by Pro Motion (Cosmigo)
11. CEL files (Autodesk Animator)
12. FLX files (U-Lead, 3DStudio MAX)
13. Extensions by EGI (ITB CompuPhase)
14. Other In this document:
TRUE=1
FALSE=0

1.2.2 An IBF Object

After the header, all data transmitted may be in the following format of an IBF Object. The IBF Object Title will be one from the list in Section 1.2.3 and the IBF Object Data will be one of those as described in Sections 1.2.4 to 1.2.15.

The IBF Object is comprised of:
An object Title is one of the possible list items described in Section 1.2.3.

The Pad Length is the length in bytes of a pad at the end of the object to facilitate 64-bit alignment.
The Data Length is the length in bytes of the following data
The actual IBF Object Data, in bytes, and one of the items described in Section 1.3.

Every object in IBF will be indexed in the underlying relational database and available for add, delete, update, and query functions of the database.

Please see FIG. 8 for a complete description of the IBF Object; the field descriptions, lengths, and data.

1.2.3 IBF Object Titles

Each IBF Object may contain one of these enumerated values as the entry in its Title field:
1. Library
2. Book List
3. Book
4. Owner
5. TOC
6. Title Pages
7. Chapter
8. Page
9. Paragraph List
10. Paragraph
11. Format
12. Additional Content
13. Image List
14. Audio List
15. Highlight List
16. Notes List
17. Drawing List
18. Other—Future Development 1.3 IBF Object Data The following represents the types of data that could appear in the data field of each IBF Object.

1.3.1 Library

The Library Object (see FIG. 1A item #1) is a list of categories and a list of books for each category (items #2 and #3). The Library Object is used on the system to hold the list of all books loaded onto the local system.

IBF Library Object Data is comprised of the Category Types field and Book List field. The Category Types are selected from the enumerated list of the following exemplary types:
1. Fiction—Animals
2. Fiction—Arts & Entertainment
3. Fiction—Health and Fitness
4. Fiction—Mental Health
5. Fiction—Business, Work, Money
6. Fiction—Games & Hobbies
7. Fiction—Historical
8. Fiction—Holidays
9. Fiction—Humorous
10. Fiction—Literature
11. Fiction—Love & Relationships
12. Fiction—Mystery & Crime
13. Fiction—Political Science & Social Issue
14. Fiction—Religion
15. Fiction—Science Fiction & Technology
16. Fiction—Short Stories & Anthologies
17. Fiction—Sports
18. Fiction—Travel & Transportation
19. Non-Fiction—Animals
20. Non-Fiction—Arts & Entertainment
21. Non-Fiction—Health and Fitness
22. Non-Fiction—Mental Health
23. Non-Fiction—Business, Work, Money 24. Non-Fiction—Games & Hobbies
25. Non-Fiction—Historical
26. Non-Fiction—Holidays
27. Non-Fiction—Humorous
28. Non-Fiction—Literature
29. Non-Fiction—Love & Relationships
30. Non-Fiction—Poetry
31. Non-Fiction—Political Science & Social Issue
32. Non-Fiction—Religion
33. Non-Fiction—Science & Technology
34. Non-Fiction—Short Stories & Anthologies
35. Non-Fiction—Sports
36. Non-Fiction—Travel & Transportation
37. Children's
36—1000 Other—Subtypes of the above The Book List field is an index to an IBF Book List Object where the data is described in Section 1.3.2.

Please see FIG. 9 for a complete description of the IBF Library Object Data; the field descriptions, lengths, and data.

1.3.2 Book List

A Book List Object is a list of books. See FIG. 1A item #3. The Book List refers to a specific instance of an IBF database, however in the case of Federated Servers described in Section 4, it is feasible that a Library Object containing Book Lists may be transmitted between IBF systems that have mirrored databases.

IBF Book List Object Data is comprised of:
The Book field is an index into the database to an IBF Book Object Data.

Please see FIG. 10 for a complete description of the IBF Book List Object Data; the field descriptions, lengths, and data.

1.3.3 Book

The data in the IBF Book Object now contains the information associated with the entire book. See FIG. 1A item #5.

IBF Book Object Data may be comprised of, for example:
The Security Key is the valid key derived according to the security description in Section 3.4 and may be used as the unique hash key to the Book.
The Title is the actual Book Title as a character string.
Language is one of the enumerated types from the Library of Congress MARC code list as shown in the Appendix.
The ISBN number is that listed by Bowker's Books in Print database for the book title and publisher.
The Owner Field is an index to an IBF Owner Object as described in Section 1.3.4.
The Price is an integer.
The Price Format may comprise, for example, one of the following enumerated types:
1. USD United States Dollars
2. GBP United Kingdom Pounds
3. EUR Euro
4. JPY Japan Yen
5. DEM Germany Deutsche Marks
6. FRF France Francs
7. NLG Netherlands Guilders
8. ITL Italy Lira
9. CHF Switzerland Francs
10. AUD Australia Dollars
11. ATS Austria Schillings
12. BEF Belgium Francs
13. CAD Canada Dollars
14. CLP Chile Pesos
15. DKK Denmark Kroner
16. NLG Dutch Guilders
17. FJD Fiji Dollars
18. FIM Finland Markka
19. FRD Greece Drachmas
20. HKD Hong Kong Dollars
21. ISK Iceland Krona
22. IDR Indonesia Rupiah
23. IEP Ireland Punt
24. ILS Israel New Shekels
25. KRW Korea (South) Won
26. LUF Luxembourg Francs
27. MYR Malaysia Ringgit
28. NZD New Zealand Dollars
29. NOK Norway Kroner
30. PHP Philippines Pesos
31. PTE Portugal Escudo
32. ROL Romania Leu
33. RUR Russia Rubles
34. SAR Saudi Arabia Riyal
35. SGD Singapore Dollars
36. KRW South Korea Won
37. ESP Spain Pesetas
38. SEK Sweden Krona
39. CHF Switzerland Francs
40. TWD Taiwan Dollars
41. THB Thailand Baht
42. TRL Turkey Lira
43. Other—Future developed Type The Annotation is an index into the database to an IBF Paragraph Object as described in Section 1.3.10. As a Paragraph Object, the annotation could then contain text, image, and formatting information making this very flexible.

The TOG Object is described in Section 1.3.5.

FIG. 11 provides a complete description of the IBF Book Object Data; the field descriptions, lengths, and data.

1.3.4 Owner

The Owner Object Data is comprised of all information related to the publisher.

The IBF Owner Object Data contains:
Each of the fields in this object is a string of the pertinent information relating to the publisher.

Please see FIG. 12 for a complete description of the IBF Owner Object Data; the field descriptions, lengths, and data.

1.3.5 TOC

The TOC or table of contents object for the book is comprised of title pages, the Preface If it exists, and the list of chapter objects. See FIG. 1A items #6 and #7.

The IBF TOC Object Data is comprised of:
The Title Pages field is an index into the database to an IBF Title Pages Object as described in Section 1.3.6 see FIG. 1A items #8 and #9.
The Preface field is an index into the database to an IBF Paragraph Object Data described in Section 1.3.10.
Each Chapter listed is an index into the database to an IBF Chapter Object as described in Section 1.3.7. See FIG. 1A items #10 and #11.

Please see FIG. 13 for a complete description of the IBF TOC Object Data; the field descriptions, lengths, and data.

1.3.6 Title Pages

The Title Pages are represented by an object with Title, Copyright page information, Title Image, Logo and Logo Text. This object would contain all the data for the opening pages of a book. See FIG. 1A item #9.

The IBF Title Pages Object Data contains:
The Title is the actual Book Title as a character string.
The Copyright field contains the text describing all copyright information.
The Title Image Type field is one of the image types from the enumerated list in Section 1.2.1.

The Title Image—Length field indicates how large the image is in bytes.

The Title Image is the actual image file.

The Logo Image Type field is one of the image types from the enumerated list in Section 1.2.1.

The Logo Image—Length field indicates how large the image is in bytes.

The Logo Image is the actual image file.

The Logo Text is the publisher information as a character string with line breaks to be displayed on the title page of the book. This may be the same as the Owner Object Data information or may be different.

The Format field is an index into the database to an IBF Object of type Format as described in Section 1.3.11.

Please see FIG. 14 for a complete description of the IBF Title Pages Object Data; the field descriptions, lengths, and data.

1.3.7 Chapter

A Chapter is an object that holds, a title, title image, and all the pages for that chapter. See FIG. 1A item #11.

The IBF Chapter Object Data is comprised of:

The Title is the Chapter Title in text.

Each Page field is an index into the database to an IBF Page Object as described in Section 1.3.8. See FIG. 1A items #12 and #13.

The Title Image Type field is one of the image types from the enumerated list in Section 1.2.1.

The Title Image—Length field indicates how large the image is in bytes.

The Title Image is the actual image file.

The Format field is an index into the database to an IBF Object of type Format as described in Section 1.3.11.

Please see FIG. 15 for a complete description of the IBF Chapter Object Data; the field descriptions, lengths, and data.

1.3.8 Page

The Page Object Data holds all the information for a single page at 100% Zoom setting. If the Zoom is changed, more or less data would be displayed, but the object always holds the data for the normal setting.

The IBF Page Object Data contains:

The Paragraph List is an index into the database to an IBF Object of type Paragraph List as described in Section 1.3.9. See FIG. 1A items #14 and #15.

Zoom Size is an integer representing a percentage in the range from negative to positive and could be greater than 100 or less than −100.

Note: The Zoom could be implemented by a scrolling function that uses an algorithm from the starting Zoom Size to calculate the current.

Pagination On/Off is TRUE or FALSE.

Page Number is the current page number base on the settings of Zoom and Pagination On/Off. If the Pagination is on, the User will see the page numbers displayed where ever they fall on the page according to Zoom setting based on Pages represented at 100% setting. This is useful during a class setting where the instructor says "Turn to page . . ." However, if the user wants to change the Zoom and does not care about the page number, pagination may be turned off.

Please see FIG. 16 for a complete description of the IBF Page Object Data; the field descriptions, lengths, and data.

1.3.9 Paragraph List

The Paragraph List object holds all the paragraphs for this chapter at 100% Zoom setting. If the user sets the Zoom to something other than 100%, this affects how much data is buffered up to the display driver on the Reading Display and how much text is displayed. However, it does not change the Paragraph entities themselves. See FIG. 1A item #16.

The IBF Paragraph List Object Data contains:

The Paragraph field which is an index into the database to an IBF Paragraph Object as described in Section 1.3.10. See FIG. 1A items #17 and #18. All paragraphs associated to the book will be listed here.

Please see FIG. 17 for a complete description of the IBF Paragraph List Object Data; the field descriptions, lengths, and data.

1.3.10 Paragraph

Figure 1B:
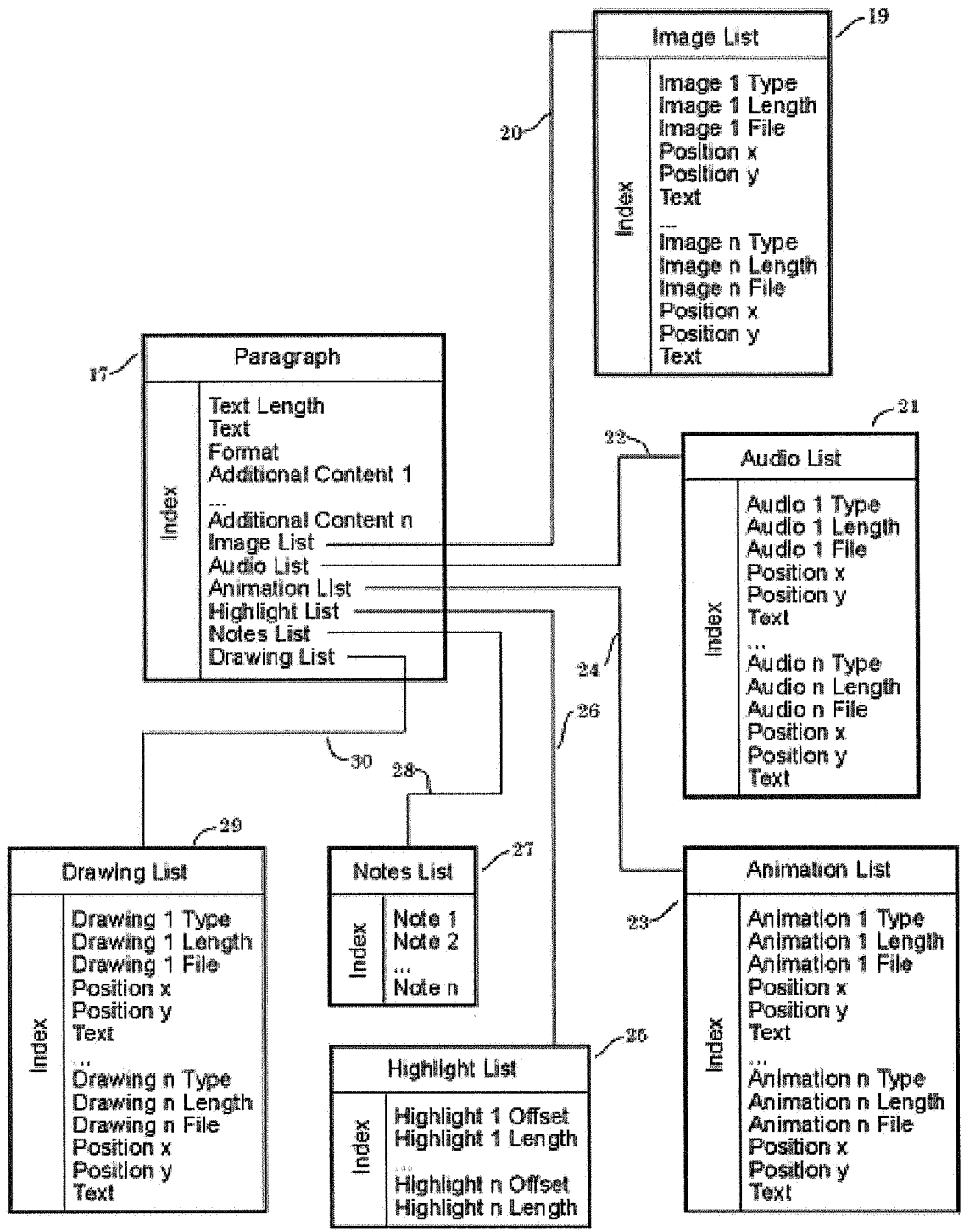
FIG. 1B shows the IBF Paragraph Data Object and all related IBF Objects.

The Paragraph is the smallest independent object in the schema (see FIG. 1B). It holds all additional content or data associated with that paragraph. A complete paragraph is always loaded to the text display driver on the Reader Display and the associated additional content is available through the user interface menus on the Navigator Display (See Section 2 describing the User Interface menus). In this way the user can Zoom in and out on text size and still have their additional content loaded in Navigator Display. Many Paragraphs and even full Pages can be buffered up on the Reader Display to improve performance, but the key entity in the IBF design is the Paragraph.

The IBF Paragraph Object Data is comprised of:

The Text Length field indicates the number of bytes of text following in the next field The Text field contains the actual text of the paragraph as a character string.

The Format field is an index into the database to an IBF Object of type Format as described in Section 1.3.11.

Each of the Additional Content fields index into the database to an IBF Object of type Paragraph Object Data. See FIG. 1A and FIG. 1B, items #17 and #18. Each of these is a link to another paragraph that could hold Historical, Biographical, or Geographical data. This data would be displayed on the Navigator Display Features window in this design. Only the text of the book is shown on the Reader Display (See Section 2).

The Image List field is an index into the database to an IBF Image List Object as described in Section 1.3.12.

The Audio List field, like the Image List field is an index into the database to an Audio List Object described in Section 1.3.13.

The Animation List field is an index into the database to an Animation File List Object described in Section 1.3.14.

The Highlight List Field is an index into the database to a Highlight List Object as described in Section 1.3.15.

The Notes List field is an index into the database to an IBF Notes Object as described in Section 1.3.16.

The Drawing List field is an index into the database to an IBF Notes Object as described in Section 1.3.17.

Please see FIG. 18 for a complete description of the IBF Paragraph Object Data; the field descriptions, lengths, and data.

1.3.11 Format

The IBF Format Object contains formatting information for the text in the paragraph.

The IBF Format Object Data is comprised of:

The Font Character Sets types are taken from IANA. As specified by IANA, "These are the official names for character sets that may be used in the Internet and may be referred to in Internet documentation. These names are expressed in ANSI$_x$3.4-1968 which is commonly called US-ASCII or simply ASCII. The character set most commonly use in the Internet and used especially in protocol standards is US-ASCII, this is strongly encouraged. The use of the name US-ASCII is also encouraged. The character set names may be up to 40 characters taken from the printable characters of US- ASCII. However, no distinction is made between use of upper and lower case letters."

Fonts on the IBF system would be installed as Font packages with the initial setup of the system software. So, fonts would be recognized by font name per Character Set. For instance if the Character set is set to Unicode, the font name should be one chosen from the fonts designed for Unicode. If the font name can not be found on the system, there should be some algorithm to choose one that is close. Presentation on digital devices will be very important to publishers and the reading public. This is an area in which the software can be very complex.

The Font Character Set field indicates one of the following enumerated types:
1. US-ASCII
2. Unicode
3. Window's Character Sets
4. Other Manufacturers—list may be extended.

The Font Family Name is recognized from the fonts in Font Character Set by font name.

The Font Pt Size is an integer.

The Type Style is one of the following:
1. Regular or Roman
2. Italic
3. Bold
4. Bold Italic
5. Underlined Kerning is an integer. It is often in the range −200 to 200, but could be any value Vertical Scale is an integer representing a percentage.

Horizontal Scale is an integer representing a percentage.

Tracking is an integer representing a percentage.

Skew is an integer representing degrees—any number from 0 to 100 may be entered into this field.

Language is one of the enumerated types from the Library of Congress MARC code list as shown in the Appendix.

Please see FIG. 19 for a complete description of the IBF Format Object Data; the field descriptions, lengths, and data.

1.3.12 Image List

This is a list of images to be displayed with the text on either the Reader Display, to mimic the original book, or on the Navigator Display as the additional content is displayed in this design. The x,y position gives placement information and the text would be displayed below the image. See FIG. 1B items #19 and #20.

The IBF Image List Object Data contains:
The Image—Type field indicates which type of image file it is from the enumerated list in Section 1.2.1.
The Image Length field indicates the length of the image file in bytes.
The Image—Position x and Position y fields hold the position on the page that the bottom left-hand corner of the image should be placed.
The Image field is the actual file.

Please see FIG. 20 for a complete description of the IBF Image List Object Data; the field descriptions, lengths, and data.

1.3.13 Audio List

The Audio List Object contains a list of sound files that could be played out with this paragraph. See FIG. 1B items #21 and #22.

The IBF Audio List Object Data contains:
The Audio—Type field indicates which type of image file it is from the enumerated list in Section 1.2.1.
The Audio Length field indicates the length of the audio file in bytes.
The Audio—Position x and Position y fields hold the position on Reader Display screen that could be used as a trigger to play this file.
The Audio—Text field could be used to hold a string of text that would trigger the file to play.

Please see FIG. 21 for a complete description of the IBF Audio List Object Data; the field descriptions, lengths, and data.

1.3.14 Animation List

The Animation List contains animation files to be played out with the paragraph on the Navigator Display menu containing the additional features. See FIG. 1B items #23 and #24.

The IBF Animation List Object Data contains:
The Animation—Type field indicates which type of image file it is from the enumerated list in Section 1.2.1.
The Animation Length field indicates the length of the animation file in bytes.
The Animation—Position x and Position y fields hold the position on the Reader Display screen that could be used as a trigger to play this file.
The Animation—Text field could be used to hold a string of text that would trigger the file to play.

Please see FIG. 22 for a complete description of the IBF Animation List Object Data; the field descriptions, lengths, and data.

1.3.15 Highlight List

This is a list of offsets to text that the user has highlighted in this paragraph. See FIG. 1B items #25 and #26.

The IBF Highlight List Object Data contains:
The Highlighted Offset is the offset in number of words of text from the beginning of the paragraph for text that is to be highlighted.
The Highlighted Length is the number of words of text from the offset position to the end of the highlighted text.

Please see FIG. 23 for a complete description of the IBF Highlight List Object Data; the field descriptions, lengths, and data.

1.3.16 Notes List

The IBF User Notes Object is comprised of a list of notes for the book that is opened. The IBF system software may also display all user notes on a menu display. A Note would be an added feature and could be displayed on the Features Display screen (See Section 2.6.2), or a pop-up window. See FIG. 1B items #27 and #28.

The Notes are another kind of object that not only contains this user's note, but any downloaded notes from secure user sites associated with this book. See Section 1.3.18 for a description of the IBF User Group List Object Data. The User Groups Object information is used to gain access to the User Groups out in the internet and access other notes for this book or share notes with the rest of the users in the group.

The Notes have date and timestamp information associated with them. An example would be a classroom in which the teacher has notes for the students to download associated with various paragraphs of this book. Also the students may be allowed to share notes.

The IBF User Notes Object Data contains:
The Note field is text.
The Associated Text Offset field is the offset from the beginning of the paragraph to the first word selected that this Note is related to. The user would have highlighted the text and then entered a note. The user may or may not leave the text highlighted, but it is still related here, so that when they reach that word, their note could surface from the list of Notes and be automatically displayed if the auto-play feature is enabled.

Please see FIG. 24 for a complete description of the IBF Notes Object Data; the field descriptions, lengths, and data.

1.3.17 Drawing List

The Drawing field is a user added drawing file from the types of image files. This drawing would be an added feature and could be displayed on the Features Display screen (See Section 2.6.2), another display just for drawings or a pop-up window. See FIG. 1B items #29 and #30.

The IBF Drawing List Object Data contains:

The Image—Type field indicates which type of image file it is from the enumerated list in Section 1.2.1.

The Image Length field indicates the length of the image file in bytes.

The Image field is the actual file.

Please see FIG. 25 for a complete description of the IBF Drawing List Object Data; the field descriptions, lengths, and data.

1.3.18 User Group List

The User Group List Object contains information about the User's group association within the federated server system of User Groups. See Section 4 for more information on the federated server system. The items in this object allow the user to connect to secure sites and participate in group access as in the case of a school classroom group or a subscription membership to a site.

The IBF User Group List Object Data contains:

The User Group field is a string containing a URL address to the login page of that User Group.

The Username field is the login username for this User Group.

The Password field is the login password for this User Group.

Other Security is an index into the database for some enhanced Security to be defined by User Groups and not described in detail here.

Please see FIG. 26 for a complete description of the IBF User Group List Object Data; the field descriptions, lengths, and data.

1.3.19 Other—Future Development

Any objects added to the initial base IBF design will be considered part of the IBF patent, as they could not exist without the basic design.

2 IBF System User Interface Menus

The design presented here for a hand-held device displaying The Interactive Book was done specifically for the IBF technology and is part of this patent. Imagine that these two sides could be merely the display of screens on a laptop or PC, they could actually be a two sided hand-held device, or the screens could be combined for a one-sided, hand-held device with the menu options at the bottom. The system software will load the menus presented here on the any of the options mentioned. Since this is a software driven menu, the only actual hardware buttons are the ones in FIG. 2A items #35 to #39 and items #40 to #44. All other tabs presented on the menus are created as images by software and hence are flexible to be added or deleted from the user interface (see FIG. 2B #45 and #46).

The left side, item #31, will be known as the Reader Display with the screen shown in #33 and the right side, item #32, is the Navigator Display with the screen shown in #34. Either side may be implemented with touch screen technology to enable use of a stylus rather than a mouse driven selection on the menus.

The buttons shown on FIG. 2 for the Navigator Display are as follows:

Power On/Off—#35
CTRL-ALT-DEL—#36
Mute—#37
Volume Up—#38
Volume Down—#39

The buttons shown on FIG. 2 for the Reader Display are as follows:

Power On/Off—#40
Zoom Out—#41
Zoom In—#42
Page Back—#43
Page Forward—#44

2.1 The Power-On Menu

Upon powering on the user will see some kind of opening screen on the Navigator Display #34. The user then has the option to do one of the following by selecting the tabs on software driven menus. See FIG. 2B #45:

Go to the Store menu and connect to participating online stores to purchase content in IBF format Open the Library of books already loaded onto the device.

Open a Book that had been loaded, but the user had gone to another menu tab or screen. This is useful to go back to the last book opened on the system.

Go to the System menu and perform any needed system functions. This is useful on the hand-held devices to go back to a Window's desktop interface and perform regular actions.

Use the Help menu which includes the search functionality as a query on the underlying relational database. This query can span all books on the system and all elements of a book. See FIG. 2B #34

2.2 The System Menu

The System Menu is useful for the hand-held devices and may or may not be present when the software runs on a standard laptop or PC. It will allow the user to access either a Window's Desktop interface directly or manage their software and hardware as one would with the Control Panel on a desktop.

In the case that this type of device may become a standard in schools that wish to use digital textbooks, the device may be developed to prohibit general laptop or PC type access. It may prohibit the students from "surfing the Net" and only allow them to connect to online Stores or User Groups that have been pre-approved by the school. In the scenario, the System menu could provide the equivalent of the Control Panel on a laptop or PC.

The System Menu also allows the user to customize their device, or set of screens and their Library to a certain Theme, similar to customizing the desktop of a PC. Examples of such Themes are "an old fashioned Library look" or "a modern chrome and glass look" or "Art Deco" etc.

2.3 The Help Menu

The Help Menu will provide the user with a Help index of topics that cover:

Managing the device
Managing the software; upgrades, etc.
Downloading books and content in IBF
Loading books and content in IBF from media like thumb drives or flash cards
Managing the Library
Reading a Book
Search functionality The Help Menu will also include a separate icon for access the search engine directly, however given the flexibility of software driven menus, this could be a separate tab and menu in itself. See FIG. 2B #34.

2.4 The Store Menu

The Store Menu is useful on the hand-held device and especially in the cases that the access is limited, as could be for school children. On a PC or laptop, this menu might just take the user to a browser with a list of available stores. The Store Menu on the device will allow the user to select an online store or one of the enabled user groups selling books and content in IBF format Once the user selects a store, they will be connected to that store and shown the available books for sale in IBF. The user then selects a book for download and the system manager software handles the purchasing interface. This is where the security aspects come in to play. These will be described in more detail in Section 3.4, but once the user has purchased a book or some content in IBF they can only load the book onto this device or this instance of software running on the PC or laptop. The book can not be loaded into any other device or instance of the software unless a multi-person or multi-instance purchase was made. See FIG. 2C #34.

2.5 The Library Menu

The Library Menu shows the categories of types of books or digital content with lists of books per category. The amount of stored books is limited only by the resources of the device. This menu can be customized to organize books by categories like history, fiction, action, or favorites, etc. The added information would be connected to the book and not displayed here. This is not a catalogue of all items loaded onto the device, but a catalogue of books. The additional information is always associated with a particular book and approved by the publisher or owner of the copyrighted material. Although the software could easily query the database for any type of object and come up with a list of all additional content on the system.

IBF content could be in the form of books, magazine articles, papers, or pieces of books like a single chapter. This would be catalogued and available through the system search engine and most probably listed in the Library as well.

2.6 Opening a Book for Reading

The user may click on a book to open it when in the Library Menu. Once the book has been opened, if the user goes to another menu, by selecting the Open Book tab, they will be taken back to their open book at the position in the book that was last open.

Figure 2A:
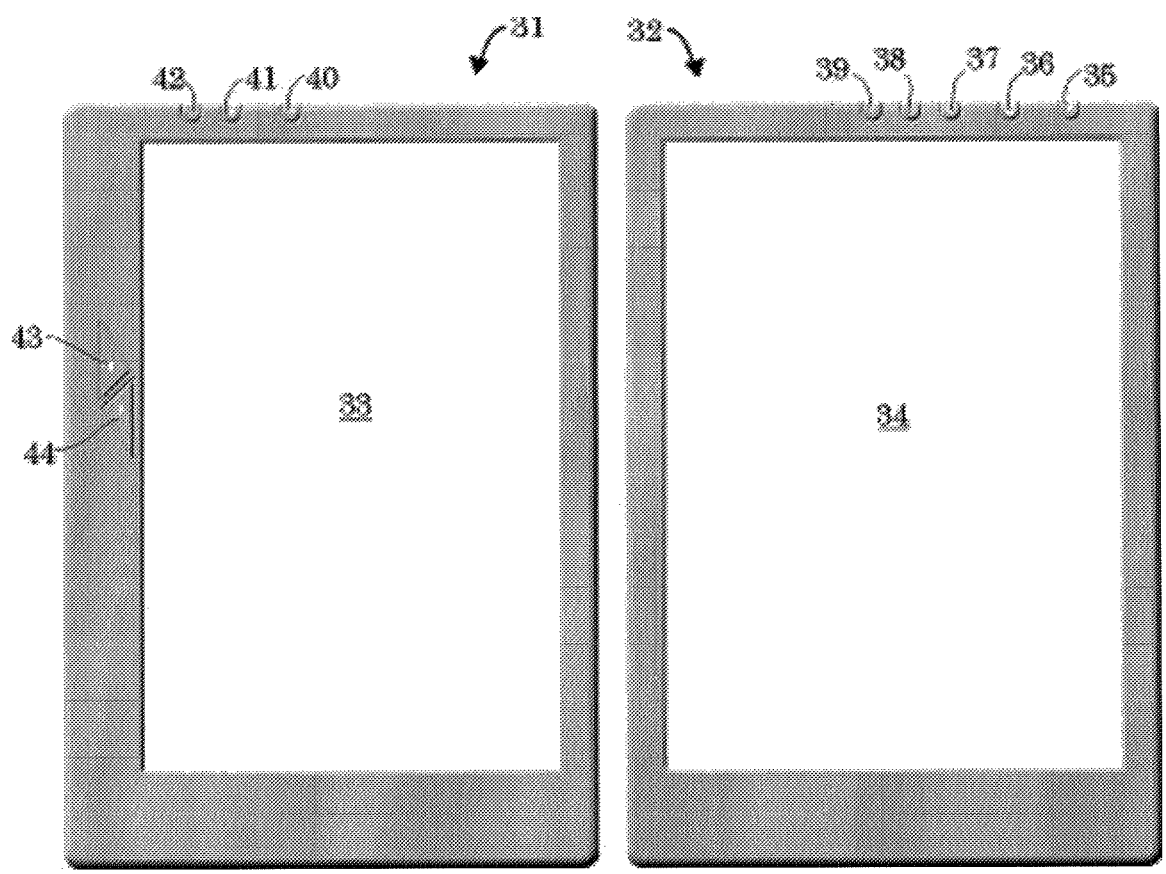
FIG. 2A shows a physical device designed to display IBF Books and additional content.
Figure 2B:
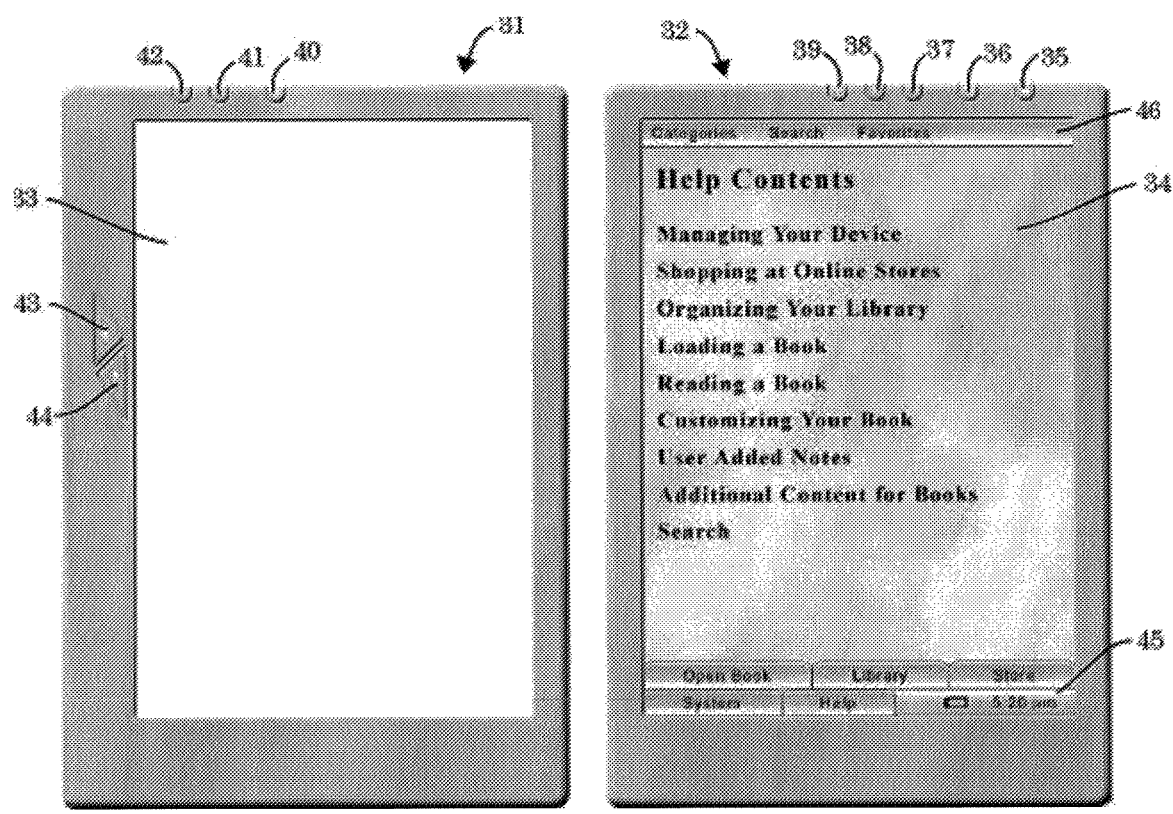
FIG. 2B shows software menu/Help Screen for Navigator Display.
Figure 2C:
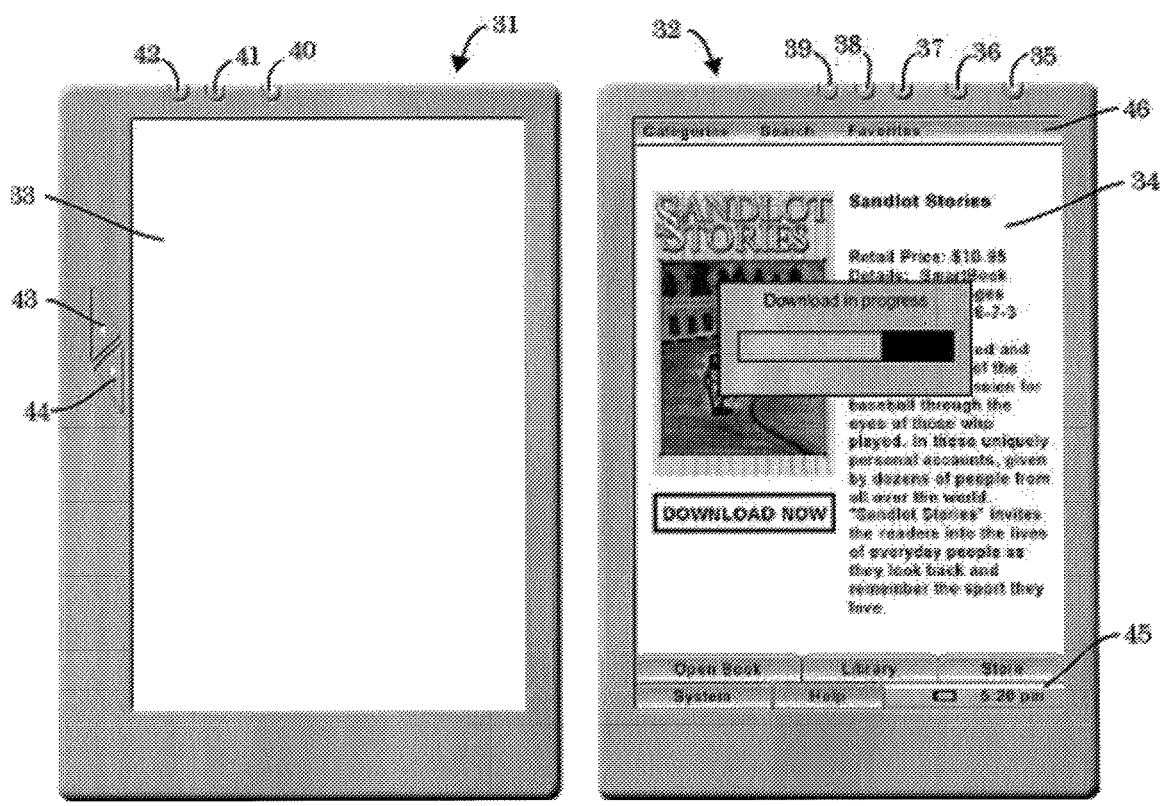
FIG. 2C Shows software menu/Store Screen for Navigator Display and downloading an IBF book.
Figure 2D:
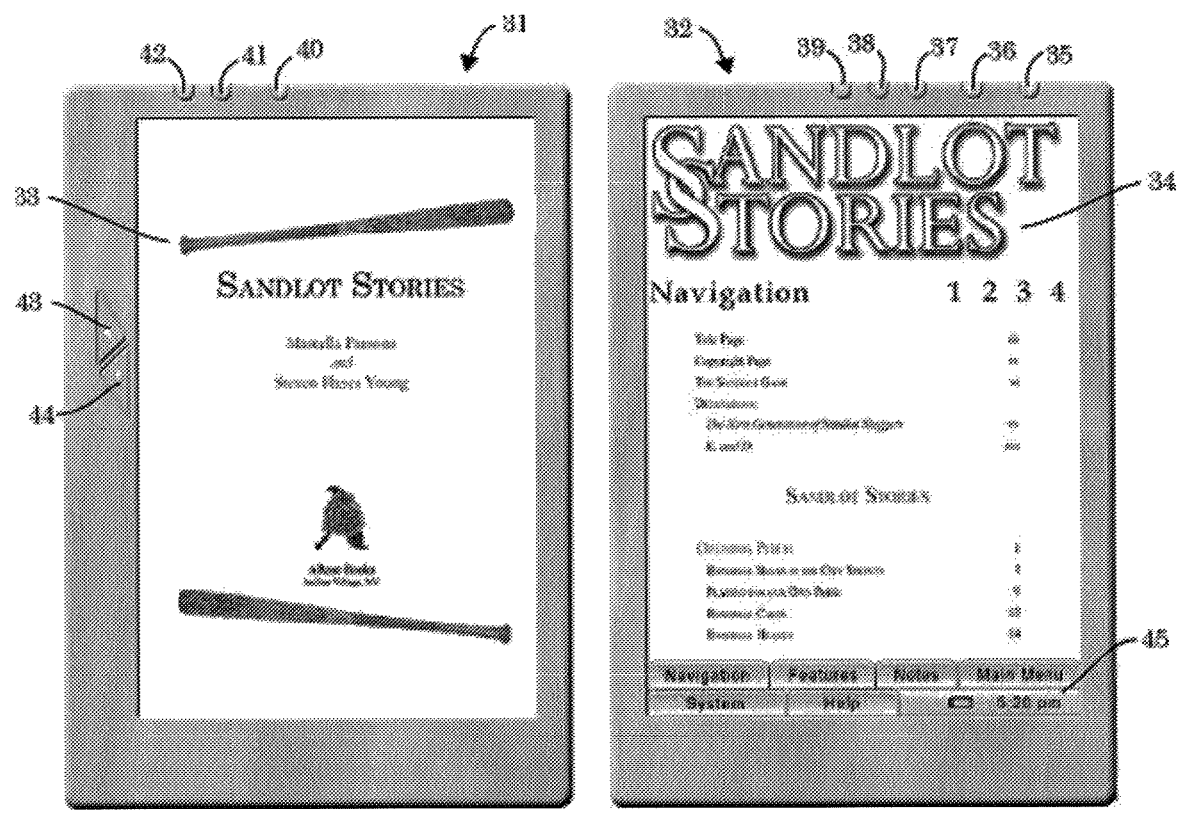
FIG. 2D shows software menu/TOC Screen for Navigator Display and an IBF book loaded with text showing on the Reader Display.

The first time a user selects a book from the Library by clicking on it, they will see the book loaded and opened with the text on the Reader Display (See FIG. 2D items #33). The Reader Display always displays the original book. This side may be on or off, independent of the Navigator Display on the right as shown by FIG. 2D item #34.

2.6.1 The TOC Menu

The TOC Menu holds the Table of Contents and supports accessing the book by clicking on one of its entries and jumping to that chapter of the book. This can also be expanded to display each individual page. The user may also just page forward or backward using the buttons on the Reader Display. See FIG. 2D #34.

2.6.2 The Features Menu

The Features Menu shows all the additional content associated with this book. This content would have been purchased in IBF binary format and pre-approved by the publisher of the book. No content can be loaded with the book unless it has a security key indicating this approval by the publisher. In this way the original book may be enhanced but can never be detracted from by unsuitable content.

Figure 2E:
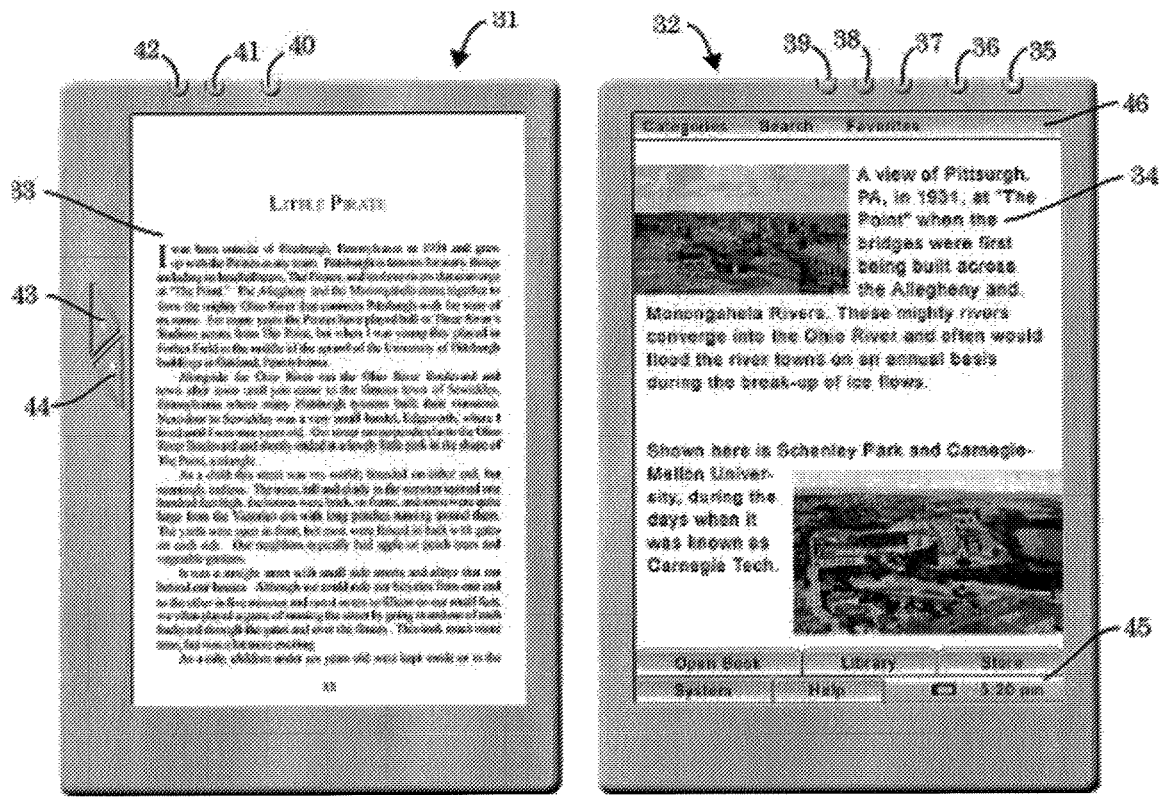
FIG. 2E shows software menu/Features Screen for Navigator Display with the IBF Book text showing in the Reader Display.

The user can go to the menu while the book is open and see all the additional content, select one and view it at any time on the Navigator Display, see FIG. 2E #34. However, this content is associated in the database with the smallest unit of the book—a paragraph. So, when the user arrives at the page holding that paragraph on the Reader Display, the feature will automatically play on the Navigator Display. This auto play mechanism may be disabled on the Features Menu. Meanwhile the text of the book itself is always shown on the Reader Display—see FIG. 2E #33.

Figure 6:
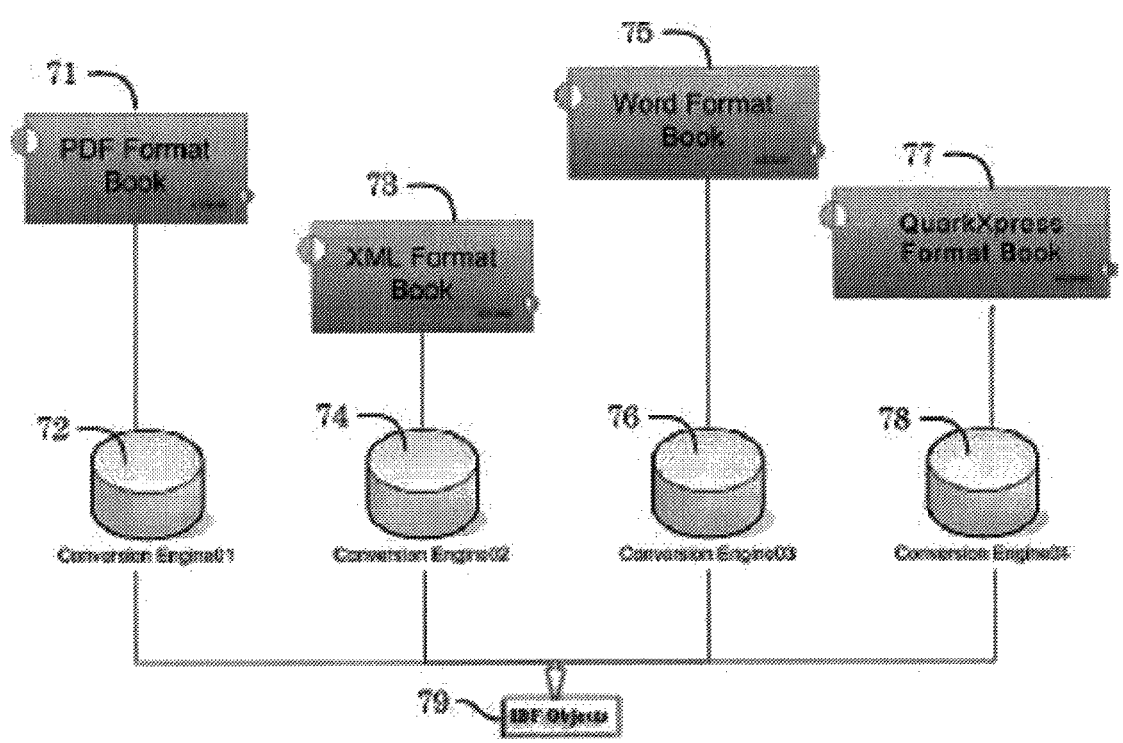
FIG. 6 shows Conversion Engines for popular publishing formats to IBF content.

Here are some examples of the additional content or Features loaded with the book Sandlot Stories and associated with the story "Little Pirate" that takes place in Pittsburgh, Pa. as shown by FIG. 6, item #33 and #34.

2.6.3 The Notes Menu

Figure 2F:
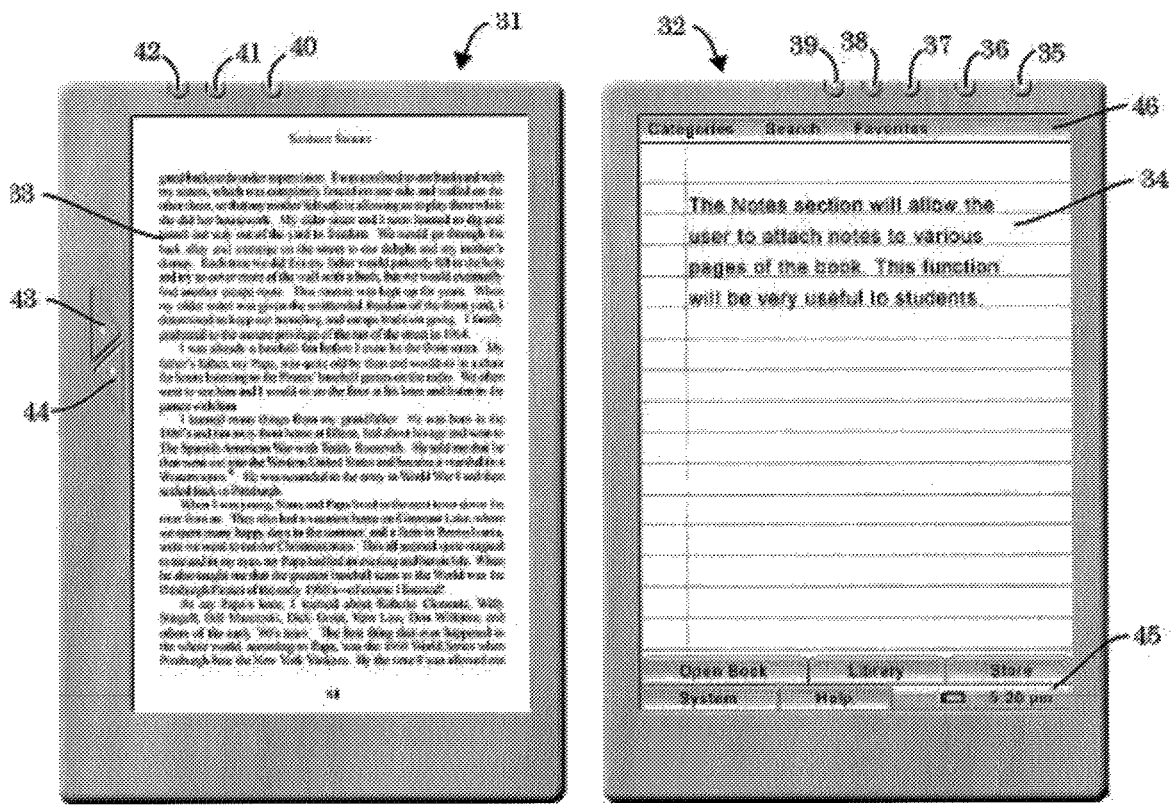
FIG. 2F shows software menu/Notes Screen for Navigator Display with the IBF Book text showing in the Reader Display.

The user may add notes to any paragraph highlighting the text that the note is associated with and inserting their note on the Navigator Display screen for Notes as shown by FIG. 2F #34. This note is then associated in the database with the current paragraph. The search functionality can show all added notes. The note taking feature could be implemented with text into a pop-up window or could include handwriting recognition software. The user can also recall and display notes as they progress through the book by their association to certain paragraphs.

3 System Software

3.1 Os Independent layer

The user interface presented in Section 2 and the loading and reading of an IBF book will be driven by underlying system software (see FIG. 3 item #47) that should communicate to the operating system (os) through an independent layer (see #49) to facilitate porting to Window's, Linux, or Apple and other operating systems with an interface to the following:

Windows or screen presentation—item #51
Network Access—TCP/UDP/sockets, etc.—item #52
Events, notifications, interrupts—item #53
The file system—item #54
The embedded relational database add/delete/query/update of IBF content—item #55
Drivers—USB or external storage media, display, etc.—#56

Figure 3:
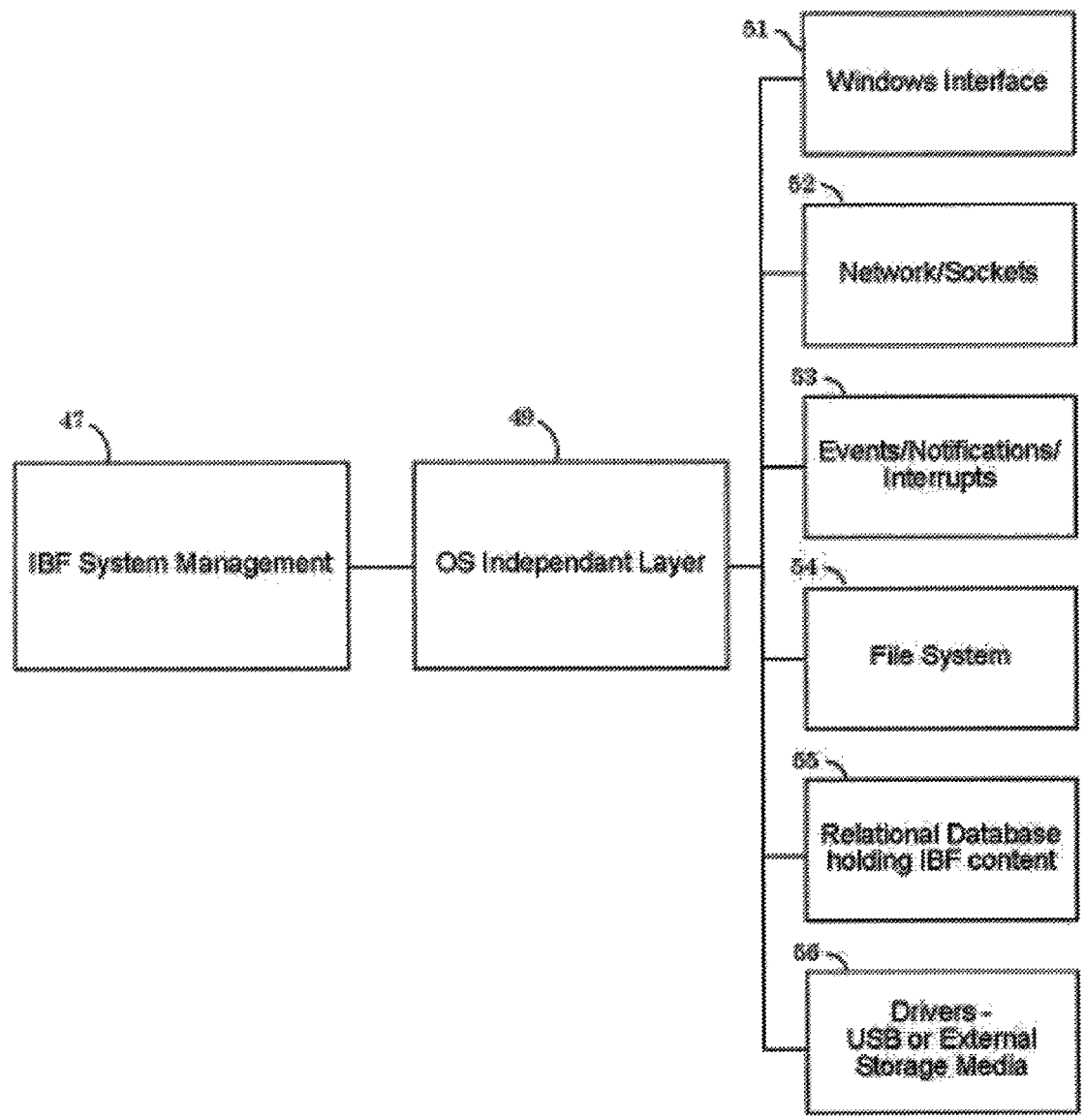
FIG. 3 shows the operating system independent layer.

The IBF system control software would interface between the display menus and user input from both the Reader Display and the Navigator Display to this os independent layer on both sides and the underlying resources as shown in FIG. 3.

3.2 System Control Software

The IBF System Control Software is designed to run on a distributed system in the hopes that the two-page hand-held electronic readers will become prevalent. With this in mind, there is the idea within the software of the two sides (although they may run on the same computer); the Navigator Display system software (see FIG. 4 item #57) and the Reader Display system software (see FIG. 4 item #58). The Navigator Display system software has much more to do than the Reader Display system software which only has to display the text of the book and respond to movement through the book.

3.2.1 The Navigator Display Control Software

The Navigator Display system software has responsibility to:

Load new books into the system database (DB) from the network or storage media—see #57 and #61

Index and add relationships within the DB for all IBF objects—see #57 and #59

Perform all add, delete, query, and other DB functions on the embedded DB—see #57 and #59

Update the system Library with the new book title information—see #57, #60, and #34

Interface to the system networking protocols to communicate with the internet and the possibly remote Reader Display control software—FIG. 3 #52

Handle digital rights management with remote websites and exchanging of security passwords and keys—see #57 and #62

Communicate with the Central IBF Clearing House to verify keys and licenses—see #57, #62, and #63

Extract objects associated with each page of a book from the DB and pass the text and formatting to the Reader Display Control software in response to commands from the Reader Display input—see #57, #58, and #59

Display associated features from a page at the user request on the Navigator Display—#34

Change menus on the Navigator Display based on user input—#60, #57, and #34

Send/Receive commands to/from the OS independent layer to implement all of the Navigator Display control functionality—FIG. 3

3.2.2 The Reader Display Control Software

Figure 4:
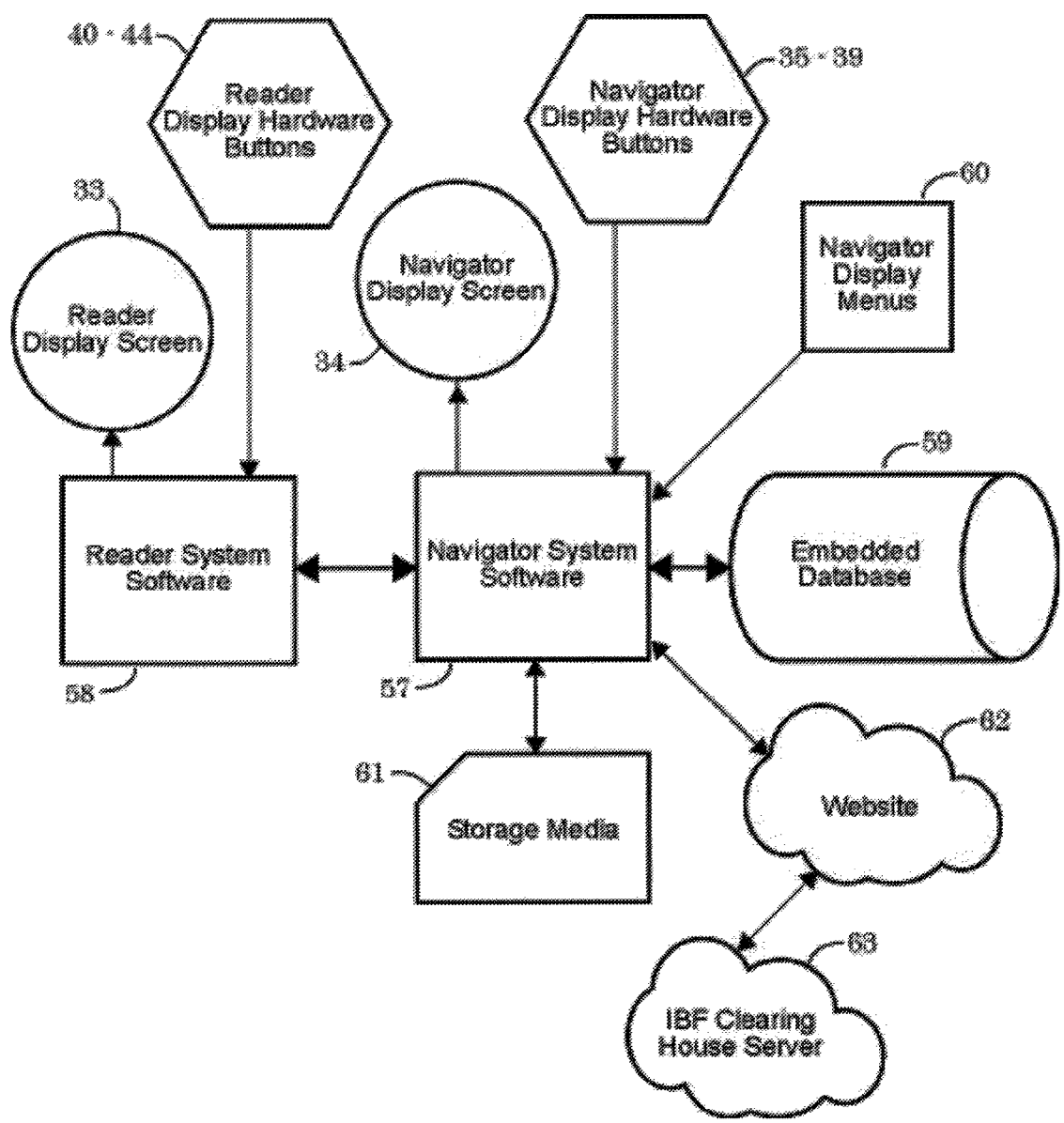
FIG. 4 shows the pieces of the IBF design.

The Reader Display control software has responsibility to:

Receive and respond to commands from the Navigator Display control software over network socket interface—see FIG. 4 #57, 58, and #33

Buffer and sort incoming data—#58

Load the Reader Display driver text data—#58 and #33

Respond to on/off from a software command or possibly a hardware button—FIG. 2A and FIG. 4 items #40 to #44

Page forward/backward from software command or possibly a hardware button—FIG. 2A and FIG. 4 items #43 and #44.

Zoom out/in from software command or possibly a hardware button—FIG. 2A and FIG. 4 items #41 and #42

Format text according to formatting information associated with the text—as shown in FIGS. 2D and 2E #33

Again, as a series of menus implemented via commands over the OS network socket interface, this design is very flexible to be run on a single computer or split across multiple computers or devices.

3.3 Search Functionality

Because an IBF book is now a collection of small parts called IBF Objects loaded into a relational database, the software can utilize the underlying query mechanism of most databases like SQL. The user interface can provide a search feature that will merely query the database for the indicated item. By relating the different items according to their relationships show in FIGS. 1A and 1B, this search functionality is facilitated. In this way the whole book becomes searchable—all IBF objects along with all the additional information loaded into The Interactive Book.

3.4 Security

When a user purchases a book or an item of digital content in IBF format, there are two scenarios:

1) The user is purchasing and downloading from an internet website. In this case the participating internet website that wishes to sell books in IBF must include as part of the purchasing process connection to a central IBF clearing house in which the sale of the book is registered for the publisher. If that step is not implemented, the sale can not complete, and the user will not have a valid security key to load their book. See FIG. 4 items #57, #62, and #63.

2) The user buys the book on portable storage media like a flash card in a traditional store. This version of a sale will have been registered with the central IBF clearing house server by the provider of the media or the distributor in the same way that books are sold now through distributors. See FIG. 4 item #61.

Once the sales process has been successfully completed, each instance of a book or piece of content in IBF format will have a unique security id or key that is a combination and completely unique to the following factors (See FIG. 1A #5):

The selling store

The book or content serial number or ISBN number

The system software serial number

The number of instances of the book purchased

Other security features like encryption, etc.

Any other information associated with the user to inhibit sharing of keys by multiple users (eg. Credit card number)

The security key is now a unique security id across all instances of software content.

This instance of the book or content is now part of the embedded database running on the device and can not be shared or given away in the way that files in PDF or Word format can be shared. This is a new concept that a book is now a collection of elements of a database and only the system software can access this underlying database. No user can write external querying software to get these elements of the database because it is embedded in the software.

This protects publishers' content. This gives the publishers a new market to sell digital books at a fraction of the publishing costs of traditional books and feel confident that they will be paid for every item sold. Participating stores, when selling a book in IBF format will register the sale with the Central IBF Clearing House so that the publisher has an accounting of every electronic book sold. See FIG. 4 items #57, #62, and #63. Currently, online bookstores buy a copy of a book in digital format and are on an honor system to report all sales. There is no way to guarantee how many copies of a digital book the bookstores might make and sell and never report.

3.5 Transmitting and Receiving IBF Books

Because each object contains all the information needed to parse that object as described in Section 1, the only enforced order on the transmitting of IBF information is to send the IBF Header first. However, it would be prudent to send the security key next in the IBF Book Object followed by the IBF Title Pages Object in order to facilitate the process of adding the book to the Library by the system software. All fields that hold an index into the database will be updated at runtime to hold a valid index into the DB. Once the binary file has been created with .ibf extension, this order is not changed, so each index in the incoming data will have meaning and be an offset into the data. When the book is loaded into the database on the system, each index can become a true index into the database. FIG. 4 items #57, #59, #60, and #61.

3.6 Backing-Up IBF Data

The preferred method for backing up IBF Data would be to retrieve the complete book (including all added features and personalized notes because this is now the book) from the database into IBF binary format as described in Section 1 onto a storage media. If done in this way the book may be reloaded as would any new book. The backup process will contain the security key as it is part of the IBF Book Object. Because each object contains all the information to read that object, there is no enforced order on the sending or backing up of data beyond placing the IBF Header as the first line in the file.

Another method would be to use the embedded database backup functionality. This might be more efficient in a large IBF system—a library system for instance. Section 4 talks about federated servers that have mirrored copies of the same database. In this scenario the backup would be a database backup of all data. By using an embedded database on the IBF local system, the built-in database backup functionality could be used locally as well.

4 Supporting Redundant Federated Servers

Because books are now elements of database, if, for example, an SQL database is used, the features of this technique include failover and redundancy across what is known as "Federated Servers". This could provide a significant benefit to stores, schools, or companies utilizing the IBF format to share content and books across distributed sites. This enhances the search engine capabilities across all of these servers. See FIG. 5.

This distributed system of servers provides a horizontal view allowing each member server to hold an identical representation of the database holding the catalogue of electronic media available for download.

Figure 5:
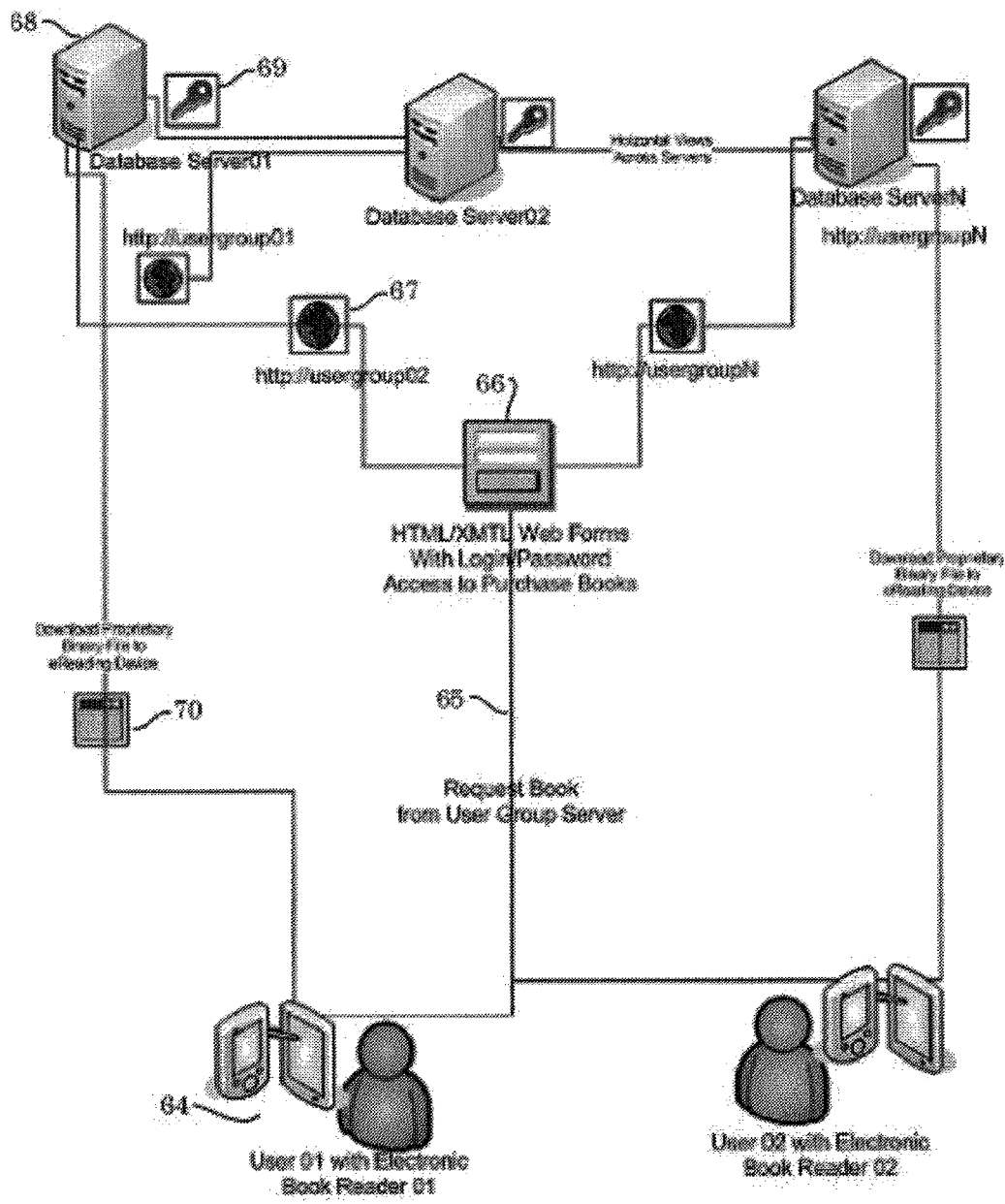
FIG. 5 shows a Federated Server system supporting User Groups and IBF data.

FIG. 5 shows redundant servers with mirrored databases for User Groups 1 to N. Item #68 is one of these servers holding a catalogue of IBF books and digital content.

A user (see #64) with an IBF system and membership in one or more of these User Groups would:

1. Request a book from one of the User Groups—item #65
2. Login with their username and password to access their member privileges—#66
3. Purchase or select the IBF book or content desired from their User Group —#67
4. The User Group would connect to one of the federated servers available—#68
5. The Security Key exchange would take place as described in Section 3.4—see item #69
6. The requested IBF book is downloaded to the user's IBF system from the connected server—#70

The fact that IBF data is comprised of database objects allows these servers to mirror their databases and the User Group could have connected with another of these servers and retrieved the IBF content.

Using federated servers supports the following functionality for User Groups:

Each User Group within the system has access to the catalogue through at least one member server.—item #68

Each User within a User Group may download media according to the user rules set by that Group for that user—item #69

Each user within a User Group may share user generated "Notes" and additional information associated with a book according to the User Group rules and security A user outside of a User Group may not access any of the privileges of a member of that User Group—item #66

Each user can connect to their member server, browse, purchase, and download an electronic book using the Navigator Display user interface menus. This process does not require the user to understand the IBF database schema.

The federated system of servers may be international or local, residing on Internet host servers or intranet servers within a firewall. The model of the system includes security settings for access.

5 Representation of the Book on Physical Media

A book may be stored on a portable storage device and sold separately in stores. This book is entered into the electronic reading system by inserting the portable storage media into the device. The IBF system software will transfer the IBF file into IBF objects stored in the embedded relational database. This is not a representation of a book as in spoken books in audio format. The book is stored in IBF binary format on the physical media and is loaded into the system as described in Section 1. See FIG. 4 #57, #59, and #61.

Imagine that the books are now sold in bookstores on this type of media. The packaging could display the book cover. This is much the trend that movies have made in going to DVD's and smaller packaging. Bookstores and libraries could hold many, many more titles than they do currently with bound books.

6 Conversion Engines

An embodiment of the inventive methodology provides' a mechanism for books to be converted to IBF format without the Publishers changing their copyrighted material. Most Publishers today have books and "eBooks" existing in formats ranging from PDF files to XML, Word documents, or Microsoft Reader format. They have a huge install base that would be difficult for them to change. See FIG. 6.

The inventive technique patent also applies to a conversion engine for each of the major publishing file formats currently in use:

PDF—see FIG. 6 #71 and #72
XML—#73 and #74
Word—#75 and #76
QuarkXpress—#77 and #78
Other The conversion engine for each popular format that will parse original content from a publisher and convert it to IBF content accordingly. These conversion engines may be implemented as separate software modules; combined into one software module; or implemented in hardware chips. Content could also be converted at download time with hardware support for the conversion engines.

Publishers can license the engines and convert their content ahead of time to be sold from internet websites or through bookstores on portable storage media.

7 Representation of the Book in Braille

The implementation of the Braille device is based on the foregoing description of the IBF objects and the system software. The user interface to the underlying Navigator Display system software and Reader Display system software will be different as described herein.

Figure 2G:
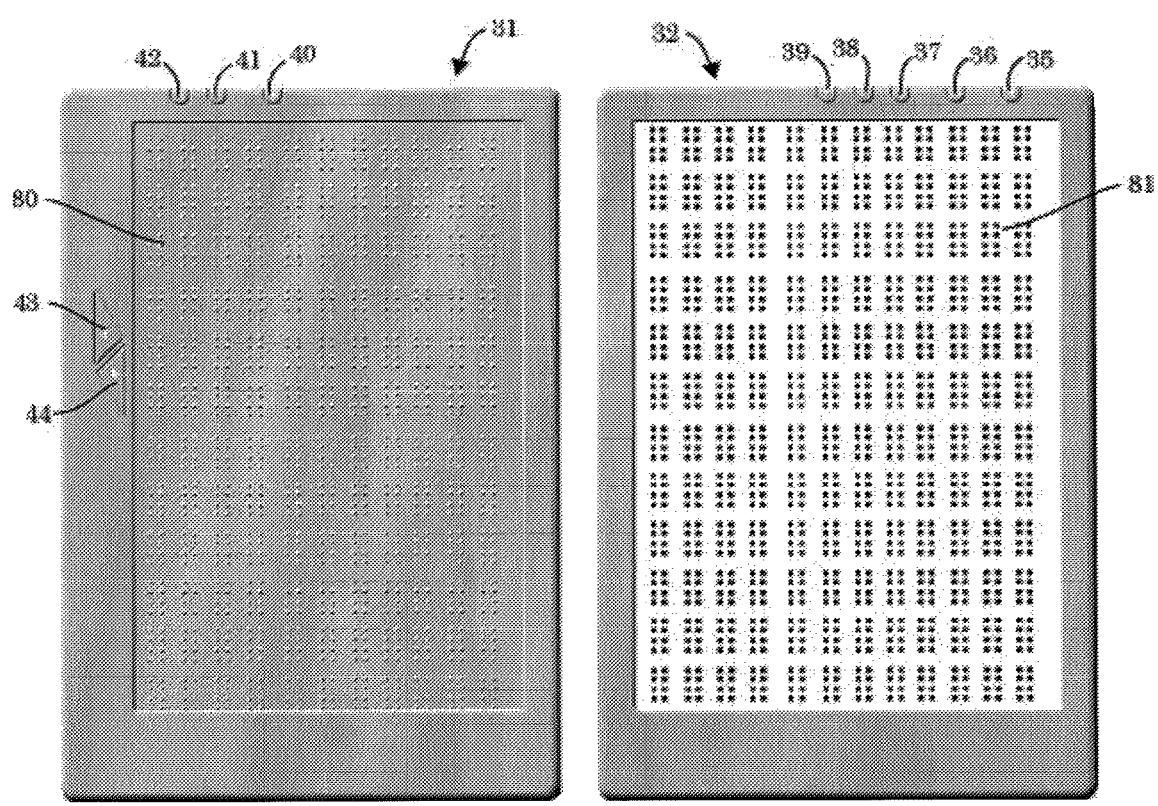
FIG. 2G shows the Braille version of a device with IBF books loaded and available for reading through refreshable Braille display technology.

The Braille Navigator Display will contain a PDA type screen covering approximately ¾ of the surface area See FIG. 2G item #81. This PDA or touch screen allows the User to interact with the book reader and select menus using a stylus. This minimizes the physical buttons needed on the device and allows for greater freedom by providing most functions through software driven menus.

The Braille version of The Interactive Book may contain a plastic insert over top the PDA touch screen with holes at appropriate places so that a visually impaired person will be able to place the stylus into the holes to select menus on the screen. The Navigator will also speak out the selections so that the user can hear and verify what they have selected. With this interface, the user can select a menu displaying their Library of Books already on their device; they can then choose a book to load for reading. The user can connect to internet websites and download new books. See FIG. 2G item #81.

When the user selects the Library, that Library Menu then opens on the Navigator Display with the system reading out to the user each selection made with the plastic holes and stylus. The user may also use speech enabled search mechanism to find and load the book they are interested in. When the user selects a book from the Library, that book is then loaded as the book being read and a Table of Contents appears on the Navigator Display for the user to select any page in the book to advance to using the plastic insert with holes and the stylus.

The Reader Display contains a screen covering approximately ¾ of the surface area of refreshable Braille display technology as shown by FIG. 2G item #80. This is a dynamic screen that displays one page of text from the book at a time using pins that rise up and down such as tiny solenoids or piezo-electric outputs.

The terrific thing about this is that there is no change in the formatting of the book as provided by the publisher. Any book that can be read on The Interactive Book may be also read in the Braille version. This opens up the world of reading for visually impaired persons to any book in this electronic format. By using The Interactive Book software in this way, The Braille Reader is simply another way of displaying the text, there is really no change to the Navigator Display functions from the original design beyond the plastic insert and a reorganization of the presentation menu to match up with the holes in the plastic insert. There is no change to the IBF formatting of the book or additional content. The only addition is that user would have the sound feature on all the time and the system would speak out each selection the user has made or they could search by speaking to the system.

Today books made in Braille are prohibitively expensive and take a long time to make. Only a fraction of books in the world have been converted to Braille. With this design, the visually impaired person now has all books converted to IBF format available to them to read in Braille.

8 Refreshable Braille Displays:

A Braille display is a tactile device consisting of a row of special 'soft' cells. A soft cell has 6 or 8 pins made of metal or nylon; pins are controlled electronically to move up and down to display characters as they appear on the display of the source system—usually a computer or Braille note taker. Soft Braille cells have either 6 or 8 dot pins depending on the model. Advanced Braille code features 8 dot Braille, but most will probably only use the 6 dot code. Dots 7 and 8, if present, can be used to show the position of the cursor in the text or for European 8 dot Braille. They can also be used for advanced math work and for computer coding.

A number of cells are placed next to each other to form a soft or refreshable Braille line. As the little pins of each cell pop up and down they form a line of Braille text that can be read by touch. For the technically minded the pins that rise up and down are either tiny solenoids or piezo-electric outputs.

Some Braille displays also have a router facility. A router button (or sensor) controls the position of the text cursor press on the router button of a cell and the cursor moves directly over that letter in the text.

Soft Braille cells are combined in a line to make up a Braille display, The number of cells in a Braille display has been designed to manufacturers to suit the text modes of computer screens. This is because an important application of Braille displays is to provide access to computer text. Full size Braille lines are 80 cells long—this matches the number of characters across the width of a typical word processor screen.

Braille lines with less than 80 cells cope with an 80 character print line by displaying it in stages, e.g. a 20-cell line would display it in four stages. This is not ideal, but smaller displays are much cheaper than 80 cell lines, and so are therefore a more affordable purchase for many users.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A method for displaying electronic books on a device comprising random access memory, central processor unit, and system software, the method comprising:

representing a published electronic content in an interactive book format including interactive book format objects, the interactive book format objects including a book object, the book object including a copyright for the published electronic content;

wherein the published electronic content is retrieved using a software system for interpreting the interactive book format objects;

wherein the retrieved published electronic content is displayed to a reader on a display media, the display media utilizing pins to display the retrieved published electronic content in Braille;

wherein the copyright protects dimensions, cover, international standard book number or European article number or library of Congress number, formatting, specification, and content per page of the published electronic content, the copyright protecting the interactive book format objects;

wherein the published electronic content is protected by the copyright while being distributed either by collecting the interactive book format objects into a contiguous file or as one or more of the interactive book format objects sent across a network using a communication protocol;

wherein after retrieving the published electronic content from the interactive book format objects, display of the published electronic content is independent of the interactive book format specification, while adhering to the formatting and desired presentation of a publisher;

wherein the published electronic content is stored in a relational database residing in computer memory by using the software system, or on a storage media, and wherein the relational database is embedded within the software system; and wherein the relational database stores, for each paragraph of the published electronic content, a format object and a list of images attached to the each paragraph and wherein the format object and the list of images are used to recreate an original visual presentation and an original artwork associated with the published electronic content.

2. The method of claim 1, further comprising: enabling the reader to view the retrieved published electronic content using a screen display comprising at least one page of the published electronic content and a navigation display comprising at least one operating control menu.

3. The method of claim 1, wherein at least one of the interactive book format objects further comprises a title, a pad length, a length of data, and data.

4. The method of claim 3, wherein the interactive book format objects further comprise at least one of: Library Object, Book List Object, table of contents Object, Title Pages Object, Chapter Object, Page Object, Paragraph List Object, Paragraph Object, Formatting Object and User Notes Object.

5. The method of claim 4, wherein the published electronic content further comprises an additional content, which is associated with the Paragraph Object.

6. The method of claim 5, wherein the additional content comprises at least one of: formatting information, historical data, geographical data, biographical data, concordance, at least one image, at least one map, at least one sound, and at least one animation.

7. The method of claim 5, further comprising receiving the additional content from the reader or a user and storing the received additional content in the relational database, wherein the additional content comprises at least one of a note or a drawing related to a specific paragraph, and wherein the stored additional content is associated with a timestamp.

8. The method of claim 1, further comprising providing the published electronic content to the reader by at least one of: downloading the content from an Internet website or loading the published electronic content from a portable storage device that is physically inserted into an electronic reading system or a host computer of a reader.

9. The method of claim 1 wherein the published electronic content comprises an interactive book format Header and one or more binary interactive book format objects.

10. The method of claim 1, wherein the published electronic content is stored on a portable storage device electronically read by a system, enabling the stored published electronic content to be loaded into the relational database.

11. The method of claim 1, wherein upon a sale of the published electronic content, the sale is registered with a central interactive book format clearing house server that captures the sale for the publisher.

12. The method of claim 11, wherein an internet store making the sale of the published electronic content communicates with the central interactive book format clearing house to register the sale.

13. The method of claim 12, wherein upon registering of the sale of the published electronic content, the internet store generates a unique security key allowing the reader to read the sold published electronic content.

* * * * *